United States Patent
Ishii et al.

(10) Patent No.: US 9,189,013 B2
(45) Date of Patent: Nov. 17, 2015

(54) CONTROLLER USING INTERMITTENT INFORMATION

(71) Applicant: Panasonic Corporation, Osaka (JP)

(72) Inventors: Tomoki Ishii, Kyoto (JP); Takao Yamaguchi, Osaka (JP); Atsushi Yoshida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 257 days.

(21) Appl. No.: 13/952,097

(22) Filed: Jul. 26, 2013

(65) Prior Publication Data

US 2013/0311819 A1 Nov. 21, 2013

Related U.S. Application Data

(63) Continuation of application No. PCT/JP2012/005984, filed on Sep. 20, 2012.

(30) Foreign Application Priority Data

Sep. 29, 2011 (JP) ................................. 2011-213869

(51) Int. Cl.
- *G06F 1/08* (2006.01)
- *G06F 13/372* (2006.01)
- *G06F 13/42* (2006.01)

(52) U.S. Cl.
CPC ............... *G06F 1/08* (2013.01); *G06F 13/372* (2013.01); *G06F 13/42* (2013.01); *G06F 13/4243* (2013.01); *G06F 2213/0038* (2013.01)

(58) Field of Classification Search
CPC ................................................... G06F 1/3203
USPC ........................................................ 713/601
See application file for complete search history.

(56) References Cited

U.S. PATENT DOCUMENTS 6,412,048 B1 * 6/2002 Chauvel et al. ............... 711/158
8,463,949 B2 * 6/2013 Mimata et al. .................... 710/5

(Continued)

FOREIGN PATENT DOCUMENTS

| JP | 63-280364 A | 11/1988 |
| JP | 05-073483 A | 3/1993 |
| JP | 2006-293799 A | 10/2006 |
| JP | 2008-171232 A | 7/2008 |
| JP | 2009-301588 A | 12/2009 |
| WO | WO 2012/140848 A1 | 10/2012 |

OTHER PUBLICATIONS

International Search Report for corresponding International Application No. PCT/JP2012/005984 mailed Nov. 20, 2012.

(Continued)

*Primary Examiner* — Suresh Suryawanshi
(74) *Attorney, Agent, or Firm* — Renner, Otto, Boisselle & Sklar, LLP

(57) ABSTRACT

This controller is used in a system in which initiators and targets are connected via distributed buses to control transmission timing of an access request received from the initiators. The controller stores intermittent information including information about an intermittent period in which interference between packets can be restricted and bus operating frequency information indicating a bus operating frequency at which real-time performance is guaranteed for each initiator and which has been generated based on system configuration information and flow configuration information indicating, on a flow basis, a specification required for each initiator to access the target. The controller includes a clock generator; communications circuitry; and transmission interval setting circuitry which sets a time to send transmission permission responsive to a transmission request based on the intermittent period, a time when the transmission request is detected, and a previous transmission time.

20 Claims, 21 Drawing Sheets

(56) References Cited

U.S. PATENT DOCUMENTS

| | | |
|---|---|---|
| 8,510,606 B2* | 8/2013 | Wight et al. .................... 714/43 |
| 8,880,694 B2* | 11/2014 | Kamei et al. ................ 709/225 |
| 2003/0027585 A1* | 2/2003 | Ohnishi ........................ 455/503 |
| 2006/0242334 A1 | 10/2006 | Kyusojin et al. |
| 2008/0172509 A1 | 7/2008 | Tsunoda |
| 2008/0270658 A1* | 10/2008 | Kaneko et al. ............... 710/117 |
| 2009/0313441 A1 | 12/2009 | Mochida et al. |
| 2010/0122040 A1* | 5/2010 | Asai et al. .................... 711/147 |
| 2014/0025855 A1* | 1/2014 | Fujita et al. .................. 710/118 |

OTHER PUBLICATIONS

E. Rijpkema et al., "Trade-offs in the design of a router with both guaranteed and best-effort services for networks on chip", Computers and Digital Techniques, IEE Proceedings, vol. 150, No. 5 IET, 2003.9.22, pp. 294-302.

* cited by examiner

TABLE OF ATTRIBUTES

| No | ADDRESS | SIZE | TRANSMISSION INTERVAL |
|---|---|---|---|
| 1 | 0x8000 | 128 | 50 |
| 2 | 0x8080 | 256 | 100 |
| 3 | 0x8180 | 64 | 30 |
| ........ | | | |

| BUS WIDTH | W | byte |
|---|---|---|
| NIC PROCESSING DELAY | N | cycle |
| ROUTER PROCESSING DELAY | R | cycle |
| PACKET HEADER SIZE | H | byte |
| BUS OPERATING FREQUENCY (INITIAL VALUE) | F0 | Hz |

FIG.17

| PROCESSOR | I1 | | I2 | | I3 | | I4 | |
|---|---|---|---|---|---|---|---|---|
| FLOW ID | 11 | 12 | 21 | 22 | 31 | 32 | 41 | 42 |
| PERFORMANCE NEEDS TO BE GUARANTEED? | YES | YES | YES | YES | YES | YES | NO | NO |
| DESTINATION | T1 | T2 | T1 | T2 | T1 | T2 | T1 | T2 |
| MAXIMUM SIZE | L11 | L12 | L21 | L22 | L31 | L32 | L41 | L42 |
| AVERAGE ACCESS INTERVAL | A11 | A12 | A21 | A22 | A31 | A32 | — | — |
| PERMISSIBLE LATENCY | S1 | S1 | S2 | S2 | S3 | S3 | — | — |
| RATE ENSURED PERIOD | g1 | g1 | g2 | g2 | g3 | g3 | — | — |

FIG.18

| PROCESSOR | I1 | I2 | I3 |
|---|---|---|---|
| FLOW ID | 11 | 21 | 31 |
| PERFORMANCE NEEDS TO BE GUARANTEED? | YES | YES | YES |
| DESTINATION | T1 | T1 | T1 |
| MAXIMUM SIZE | L11 | L21 | L31 |
| AVERAGE ACCESS INTERVAL | A11 | A21 | A31 |
| PERMISSIBLE LATENCY | S1 | S2 | S3 |
| RATE ENSURED PERIOD | g1 | g2 | g3 |

FIG.19

| PROCESSOR | I1 | I2 | I3 |
|---|---|---|---|
| FLOW ID | 12 | 22 | 32 |
| PERFORMANCE NEEDS TO BE GUARANTEED? | YES | YES | YES |
| DESTINATION | T2 | T2 | T2 |
| MAXIMUM SIZE | L12 | L22 | L32 |
| AVERAGE ACCESS INTERVAL | A12 | A22 | A32 |
| PERMISSIBLE LATENCY | S1 | S2 | S3 |
| RATE ENSURED PERIOD | g1 | g2 | g3 |

| DESTINATION | T1 | T2 | T3 | T4 |
|---|---|---|---|---|
| RATE ENSURED PERIOD | G1 | G2 | — | — |
| AVERAGE NUMBER OF TIMES OF ACCESSES | M1 | M2 | — | — |
| INTERMITTENT PERIOD INFORMATION | P1 | P2 | — | — |
| TRANSMISSION TIME INFORMATION | J1 | J2 | — | — |
| NUMBER OF TIMES OF ACCESSES | m1 | m2 | — | — |
| NEXT TRANSMISSION TIME | D1 | D2 | — | — |

FIG.30

| PORT | I1 | | | I2 | | | I3 | |
|---|---|---|---|---|---|---|---|---|
| FLOW ID | 11 | 12 | 13 | 21 | 22 | 23 | 31 | 32 |
| PERFORMANCE NEEDS TO BE GUARANTEED? | YES | YES | YES | YES | YES | YES | YES | YES |
| DESTINATION | T1 | T2 | I3 | T1 | T2 | I3 | T1 | T2 |
| MAXIMUM SIZE | L11 | L12 | L13 | L21 | L22 | L23 | L31 | L32 |
| AVERAGE ACCESS INTERVAL | A11 | A12 | A13 | A21 | A22 | A23 | A31 | A32 |
| PERMISSIBLE LATENCY | S1 | S1 | S1 | S2 | S2 | S2 | S3 | S3 |
| RATE ENSURED PERIOD | g1 | g1 | g1 | g2 | g2 | g2 | g3 | g3 |

FIG.31

| PORT | I1 | I2 |
|---|---|---|
| FLOW ID | 13 | 23 |
| PERFORMANCE NEEDS TO BE GUARANTEED? | YES | YES |
| DESTINATION | I3 | I3 |
| MAXIMUM SIZE | L13 | L23 |
| AVERAGE ACCESS INTERVAL | A13 | A23 |
| PERMISSIBLE LATENCY | S1 | S2 |
| RATE ENSURED PERIOD | g1 | g2 |

| DESTINATION | T1 | T2 | I3 |
|---|---|---|---|
| RATE ENSURED PERIOD | G1 | G1 | G1 |
| AVERAGE NUMBER OF TIMES OF ACCESSES | M1 | M2 | M5 |
| INTERMITTENT PERIOD INFORMATION | P1 | P2 | P5 |
| TRANSMISSION TIME INFORMATION | J1 | J2 | J5 |
| NUMBER OF TIMES OF ACCESSES | m1 | m2 | m5 |
| NEXT TRANSMISSION TIME | D1 | D2 | D5 |

| DESTINATION | T1 | T2 | T3 | T4 |
|---|---|---|---|---|
| RATE ENSURED PERIOD | G1 | G2 | — | — |
| AVERAGE NUMBER OF TIMES OF ACCESSES | M1 | M2 | — | — |
| INTERMITTENT PERIOD INFORMATION | P1 | P2 | — | — |
| TRANSMISSION TIME INFORMATION | J1 | J2 | — | — |
| NUMBER OF TIMES OF ACCESSES | m1 | m2 | — | — |
| NEXT TRANSMISSION TIME | D1 | D2 | — | — |
| NUMBER OF ACCUMULATED CYCLES | n1 | n2 | — | — |

CONTROLLER USING INTERMITTENT INFORMATION

This is a continuation of International Application No. PCT/JP2012/005984, with an international filing date of Sep. 20, 2012, which claims priority of Japanese Patent Application No. 2011-213869, filed on Sep. 29, 2011, the contents of which are hereby incorporated by reference.

1. TECHNICAL FIELD

The present application relates to an apparatus, method and program for controlling a communications bus which is implemented as a network on a semiconductor chip.

2. DESCRIPTION OF THE RELATED ART

Recently, a network-on-chip (which will be referred to herein as "NoC") has been used more and more often as a communications bus in the fields of system on chip (which will be referred to herein as "SoC") and multi-core processors.

FIG. 1 illustrates an ordinary connection architecture in which an NoC is used as a main bus between initiators I1 through I4 and targets T1 through T4. The initiators may be a DSP (digital signal processor), a CPU (central processing unit) or a DMAC (direct memory access controller), for example. The targets may be a memory controller to be connected to an external DRAM, an SRAM or a buffer memory as an input/output buffer interfacing with an external device, for example.

These initiators and targets are connected together so as to communicate with each other through a network bus, which is formed by NoC routers R1 through R4, and via network interface controllers NIC1 through NIC8. In an NoC, every data on the bus is exchanged on a packet basis. That is why the NICs have the ability to packetize and de-packetize transaction data transmitted and received from/at those initiators and targets. Also, the NoC is configured so that links L1 through L8 that connect those routers together are used in common when packets are transmitted from the initiators I1 through I4 to the targets T1 through T4.

FIG. 2 shows an exemplary format for a packet 100. The packet is comprised of transaction data and a packet header that stores the address of a memory on which a read/write operation needs to be performed. When the packet is actually transferred through a router network, the packet is divided into smaller units called "flits", which are transmitted one after another sequentially. FIG. 3 illustrates a packet 100 made up of a number of flits 101. A flit including the top portion of the packet is called a "header flit". The data width W of each flit 101 usually becomes the bit width of a signal line that connects multiple routers together. Also, the NoC is configured so that the links L1 through L8 that connects those routers together are used in common when those initiators are accessing the targets.

As for a bus that is intended to be used in real time applications such as media processing, its performance should be evaluated between initiators and targets. In evaluating its performance, the rate and latency need to be checked out. More specifically, the rate should be high enough to give a band requested by an initiator per unit time to that initiator 100%. On the other hand, the latency should be defined so that in an initiator with the shortest permissible latency, the latency at the time of actual access (i.e., the amount of time it takes for an initiator that issued a request transaction on a bus to receive a reply transaction after the request has been processed by a target) becomes equal to or shorter than the permissible latency.

FIG. 4 illustrates how an initiator and a target may communicate with each other. Suppose Initiator A and Target B are now communicating with each other. As shown in FIG. 4, the number of cycles it has taken for a request transaction (e.g., a memory access request) issued by Initiator A to arrive at Target B is supposed to be X. Meanwhile, the number of cycles it has taken for a reply transaction (e.g., a reply indicating a result of the memory read operation) issued by Target B to arrive at Initiator A is supposed to be Y. And supposing the latency that Initiator A permits is within S cycles, the latency should be short enough to satisfy the following Inequality (1):

$$S \geq X + Y \qquad (1)$$

If this performance evaluation condition is satisfied in every initiator-target combination, then the system's performance is defined to be guaranteed.

Suppose on a system in which a number of initiators and targets are connected together via a bus that shares the same band resource as shown in FIG. 1, the rate and latency of each of those initiators need to be checked out. Japanese Laid-Open Patent Publication No. 2008-171232, hereinafter referred to as "Patent Document No. 1", discloses a method in which a bandwidth to be ensured at a peak time is estimated for each of multiple initiators that share the same bus and in which the operating frequency of the bus is designed by adding those values together with respect to all of the initiators. On the other hand, Japanese Laid-Open Patent Publication No. 2006-293799, hereinafter referred to as "Patent Document No. 2", discloses a method for guaranteeing transmission performance by controlling the transmission timing on the initiator end.

SUMMARY

According to the existent technologies mentioned above, further improvements need to be made in at least one of checking a decrease in bus operating frequency, cutting down the power dissipation, simplifying the design process, and using the bus band more efficiently. In addition, the latency should be as short as possible, too.

A non-limiting exemplary embodiment of the present application provides a controller that guarantees transmission performance while minimizing the bus operating frequency.

In one general aspect, a controller as an exemplary embodiment of the present invention is used in a system in which initiators and targets are connected together via distributed buses to control transmission timing of an access request that has been received from any of the initiators through the buses. The controller includes: an intermittent information storage which stores intermittent period information that has been generated based on system configuration information about the system's configuration and flow configuration information indicating, on a flow basis, a specification required for each initiator to access one of the targets; communications circuitry configured to obtain a clock signal to be driven at a bus operating frequency that guarantees real-time performance for each initiator and that has been generated based on the system configuration information and the flow configuration information, configured to packetize data supplied from the initiator, configured to send a packet to a router and configured to record a transmission time of an input data in response to the clock signal; and transmission interval setting circuitry which sets a time to send transmission permission responsive to a transmission request based on the intermittent period information, a time when the transmission request from the initiator is detected, and a previous transmission time.

By controlling the transmission intervals in a distributed communications bus, in which a number of initiators and targets are connected together, according to the transmission/reception characteristic of each of those initiators, interference of data between those initiators can be restricted, the rate and latency of each of those initiators can be reasonably high and short, respectively, and the bus can be operated at a low bus operating frequency. As a result, the present disclosure is applicable to various kinds of real-time processing including AV signal processing on a bus. In addition, since the operating frequency can be lowered, a chip area and other resources can be saved, too.

This general and particular aspect can be implemented as a system, a method, a computer program or a combination thereof.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 17 shows an example of the flow configuration information.

FIG. 18 shows the three flows, of which the performances with respect to the memory T1 need to be guaranteed and which are extracted from FIG. 17.

FIG. 19 shows the flow configuration information of the initiators I1 through I3 which appoint the memory T2 as their destination.

FIG. 30 shows flow configuration information for the Port I1.

FIG. 31 shows only the flows that appoint I3 as their destination as extracted from FIG. 30.

DETAILED DESCRIPTION

If the bus band were designed by the method of Patent Document No. 1, not only the bus operating frequency required to guarantee high transmission performance but also the power dissipation would increase, such a bus would be more difficult to design, and the bus band could be used less efficiently. Considering an ordinary initiator, the required band is not always constant with time due to the relation between internal processing and other initiators' processing but changes between the maximum and minimum required bands. Thus, to guarantee sufficiently high performance for every initiator of which the operating band varies with time, according to Patent Document No. 1, the peak band width to ensure is estimated for each of multiple initiators that share the same bus, the band width values of all initiators are added together, and then the bus operating frequency is designed based on the sum. In this manner, the peak band width is ensured on the bus with respect to every initiator. As a result, the condition to ensure a sufficiently high rate and a reasonably short latency is satisfied. However, unless all initiators operate in the maximum required band at the same time, the bus band exceeding the average required band would be hardly used and the band resource would be wasted.

Figure 1:
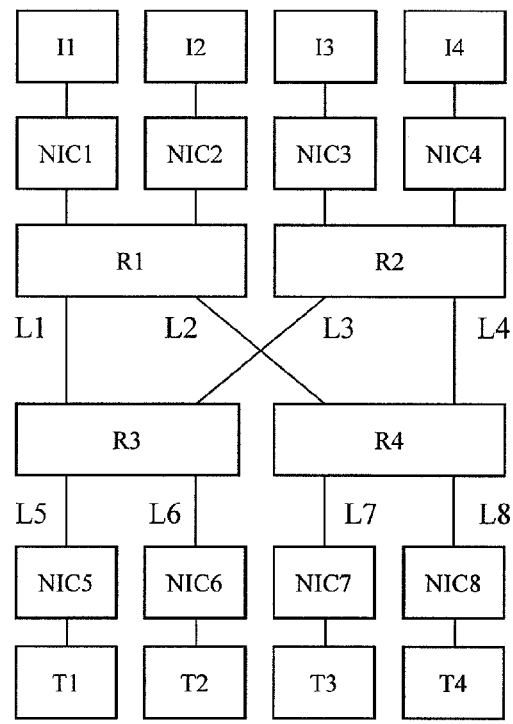
FIG. 1 illustrates an ordinary connection architecture in which an NoC is used as a main bus between initiators I1 through I4 and targets T1 through T4.
Figure 2:
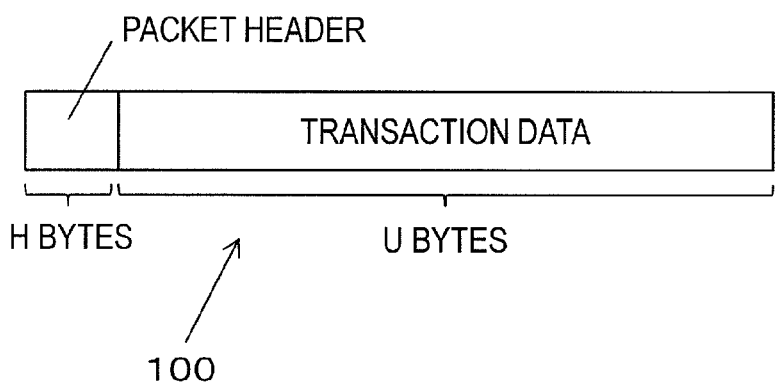
FIG. 2 shows an exemplary format for a packet 100.
Figure 3:
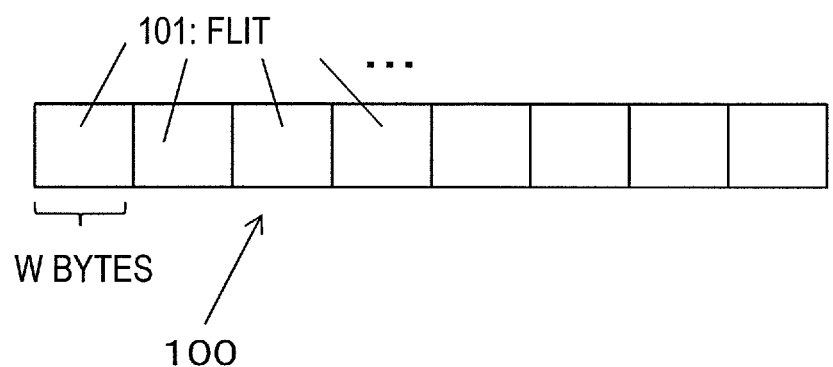
FIG. 3 illustrates a packet 100 made up of a number of flits 101.
Figure 4:
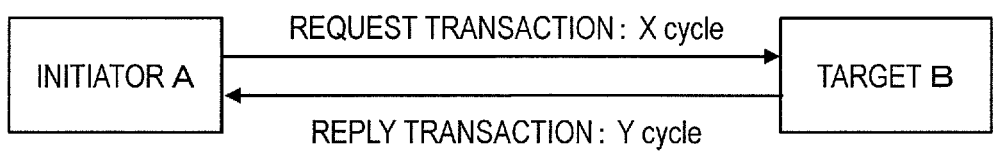
FIG. 4 illustrates how an initiator and a target may communicate with each other.
Figure 5:
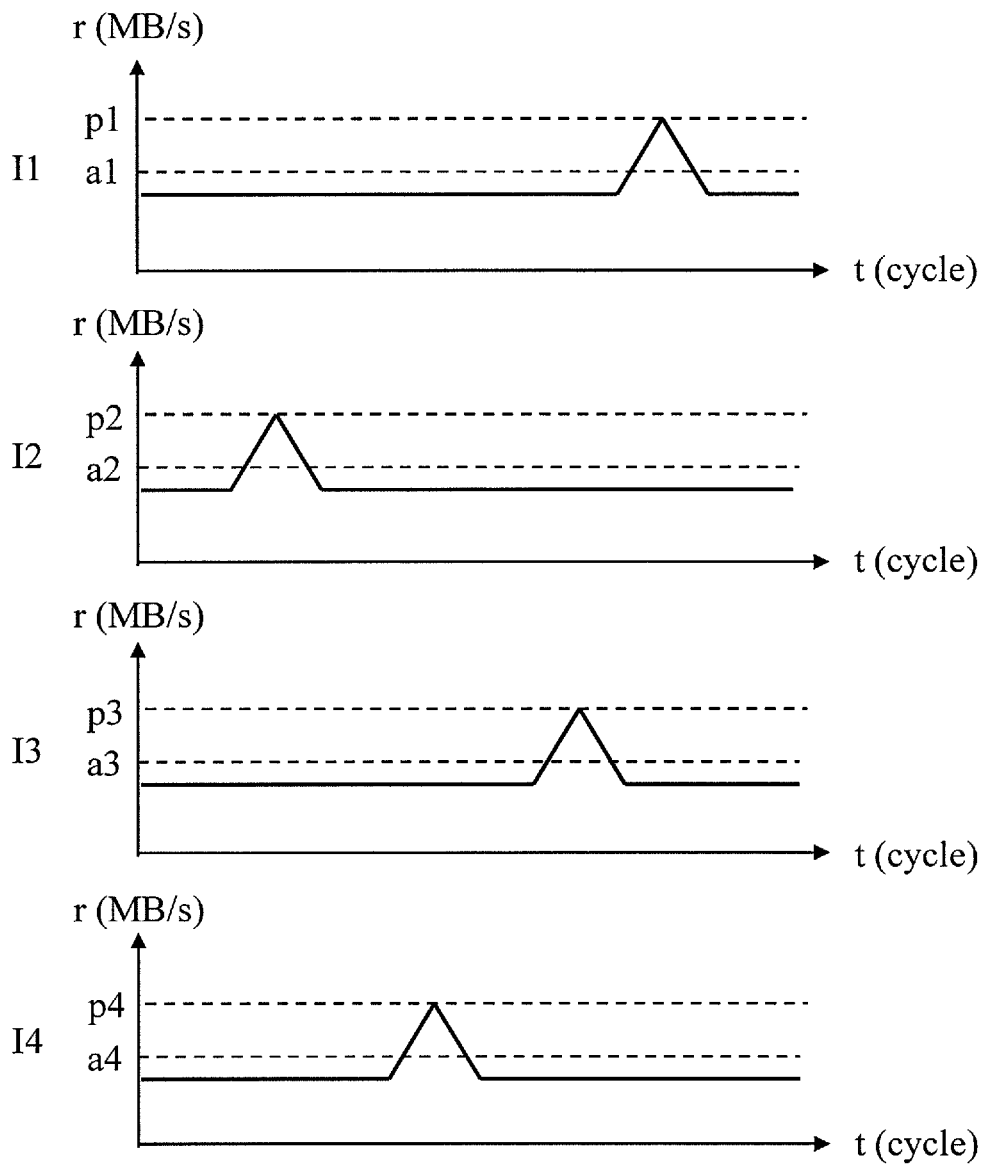
FIG. 5 shows how the required bands of Initiators I1 through I4 shown in FIG. 1 change with time.
Figure 6:
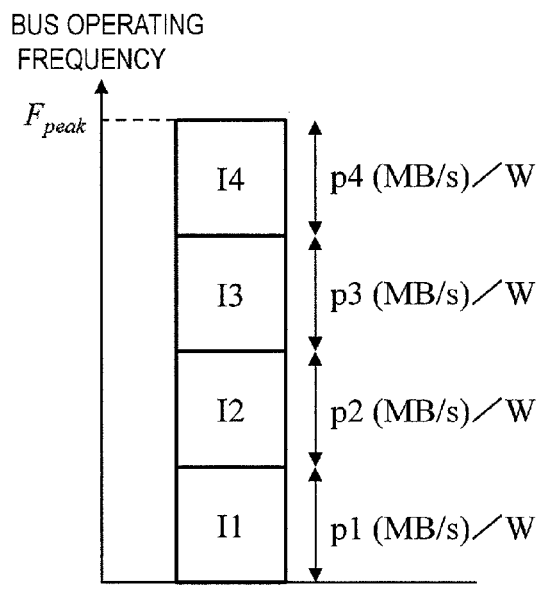
FIG. 6 illustrates a bus band design process.

FIG. 5 shows how the required bands of Initiators I1 through I4 shown in FIG. 1 change with time. In FIG. 5, the abscissa t represents the bus clock cycle, the ordinate r represents the required band, p represents the maximum required band, and a represents the average required band. FIG. 6 illustrates a bus band design process. Supposing the sum of p1 through p4 is the bus band B (MB/s) and the bus width is W bytes, the bus operating frequency Fpeak (MHz) is designed by the following Equation (2):

$$Fpeak=B/W \qquad (2)$$

Figure 7:
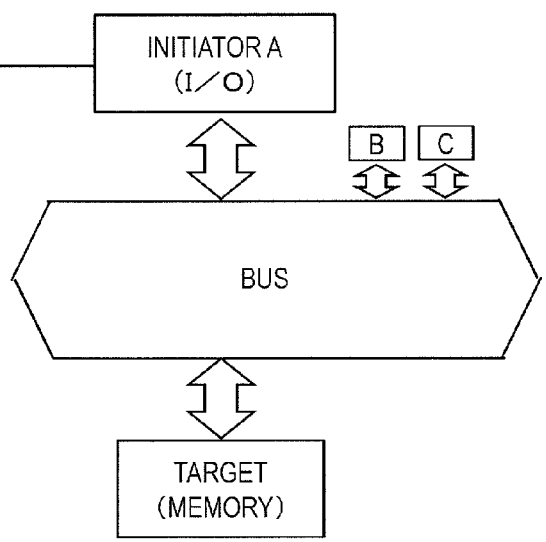
FIG. 7 illustrates how Initiators A through C and memory as a target are connected together via a bus.
Figure 8:
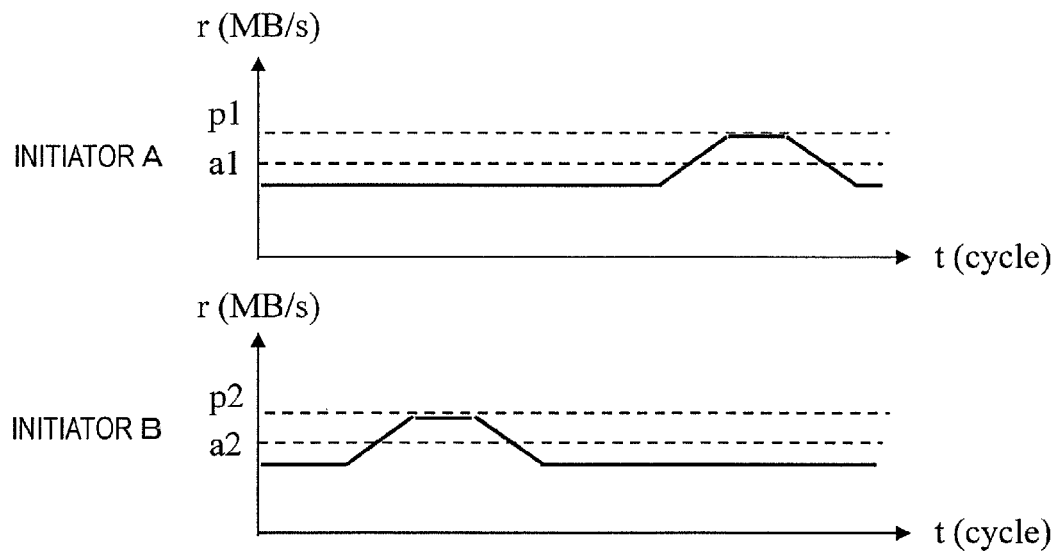
FIG. 8 illustrates how the required bands of the memory access requests by Initiators A and B change with time.
Figure 9:
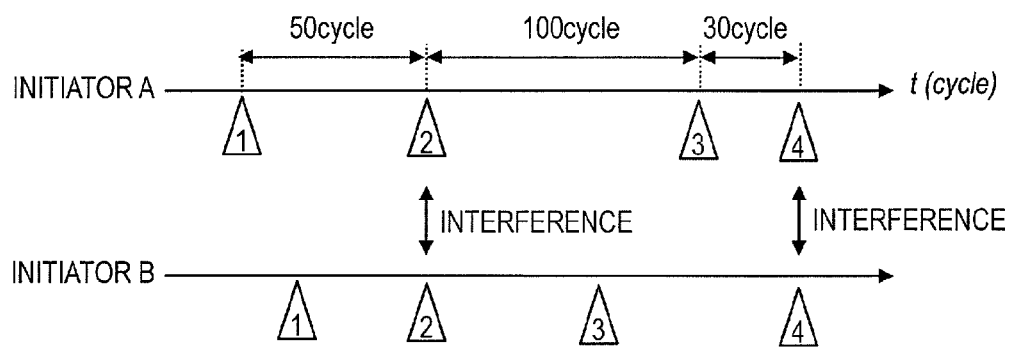
FIG. 9 illustrates an access interference occurring between multiple initiators.

Patent Document No. 2 cited above discloses a method for adjusting the maximum required band and lowering the bus operating frequency by controlling the required transaction transmission interval on the initiator end. FIG. 7 illustrates how Initiators A through C and memory as a target are connected together via a bus. By reference to a table of attributes for use to adjust the transmission interval, each of those initiators issues a memory access request on the bus in accordance with the interval setting. When a high-order processor (not shown) is setting up a DMA transfer, the addresses of the memories to access, the data sizes, and the number of delay cycles until the next access is started are set on the table of attributes. FIG. 8 illustrates how the required bands of the memory access requests by Initiators A and B change with time. It can be seen that since the maximum required band is restricted through the transmission interval control, p1 and p2 are lower than in FIG. 5 and the bus operating frequency has also been lowered. According to the method of Patent Document No. 2, however, the transmission interval is delayed by the number of delay cycles on the table of attributes. Consequently, a delay will be caused between the time when an initiator attempts to issue an access request and the time when the access is actually started on the bus. In addition, since the transmission timing is not adjusted with the other initiators, a delay will also be caused due to interference between the accesses issued simultaneously on the bus. FIG. 9 illustrates an access interference occurring between multiple initiators. Due to these factors, according to the technique of Patent Document No. 2, the actual latency becomes longer than the one permitted by Initiator A, and a reasonably short latency cannot always be ensured.

An aspect of the present invention is outlined as follows:

A controller according to an aspect of the present invention is used in a system in which initiators and targets are connected together via distributed buses to control transmission timing of an access request that has been received from any of the initiators through the buses. The controller includes: an intermittent information storage which stores intermittent period information that has been generated based on system configuration information about the system's configuration and flow configuration information indicating, on a flow basis, a specification required for each initiator to access one of the targets; communications circuitry configured to obtain a clock signal to be driven at a bus operating frequency that guarantees real-time performance for each initiator and that has been generated based on the system configuration information and the flow configuration information, configured to packetize data supplied from the initiator, configured to send a packet to a router and configured to record the transmission time of the input data in response to the clock signal; and transmission interval setting circuitry which sets the time to send transmission permission responsive to the transmission request based on the intermittent period information, the time when the transmission request from the initiator is detected, and the previous transmission time.

The intermittent information storage stores, as the intermittent period, the number of bus cycles that it takes for the targets to finish receiving every data in a situation where every initiator has transmitted data at the same time at the maximum data length at which data can be transmitted simultaneously by each initiator.

The intermittent information storage stores a maximum latency involved to transmit and receive a packet which has been calculated based on at least the intermittent period, and also stores, as the bus operating frequency, the lowest bus operating frequency to be determined under the condition that the maximum latency does not exceed the shortest permissible latency of any of the initiators.

The transmission interval setting circuitry sets the time to send transmission permission responsive to the transmission request so that the intermittent period becomes the shortest interval at which a series of packets are transmitted.

The transmission interval setting circuitry limits the number of times of transmission within a preset rate ensured period to a predetermined number of times or less as a specification for the system.

The transmission interval setting circuitry sets the interval at which a series of packets are transmitted so that the transmission interval becomes as close to an average access interval, which has been defined in advance as a specification for the system, as possible.

The intermittent information storage stores the intermittent period, which has been calculated based on the packet size of each initiator, with respect to each of the targets and initiators that are destinations.

The intermittent information storage stores the intermittent period which has been calculated with respect to each of the targets that are destinations.

A controller according to another aspect of the present invention is used in a system in which initiators and targets are connected together via distributed buses to control transmission timing of an access request that has been received from any of the initiators through the buses. The controller includes: an intermittent information generator which generates intermittent information, including information about an intermittent period in which interference between packets is able to be restricted and bus operating frequency information indicating the lowest bus operating frequency at which real-time performance of each initiator can be guaranteed, based on system configuration information about the system's configuration and flow configuration information indicating, on a flow basis, a specification required for each initiator to access one of the targets; a clock generator which generates a clock signal by reference to the bus operating frequency information; communications circuitry which operates in response to the clock signal, packetizes and transmits input data, and records the transmission time of the input data; and transmission interval setting circuitry which sets the time to send transmission permission responsive to the transmission request based on the intermittent period, the time when the transmission request from the initiator is detected, and the previous transmission time.

The intermittent information generator calculates, as the intermittent period, the number of bus cycles that it takes for the targets to finish receiving every data in a situation where every initiator has transmitted data at the same time at the maximum data length at which data can be transmitted simultaneously by each initiator.

The intermittent information generator calculates a maximum latency involved to transmit or receive a packet based on at least the intermittent period, and also determines, as the bus operating frequency, the lowest bus operating frequency to be determined under the condition that the maximum latency does not exceed the shortest permissible latency of any of the initiators.

The transmission interval setting circuitry sets the time to send transmission permission responsive to the transmission request so that the intermittent period becomes the shortest interval at which a series of packets are transmitted.

The transmission interval setting circuitry limits the number of times of transmission within a preset rate ensured period to a predetermined number of times or less as a specification for the system.

The transmission interval setting circuitry sets the interval at which a series of packets are transmitted so that the transmission interval becomes as close to an average access interval, which has been defined in advance as a specification for the system, as possible.

The intermittent information generator calculates the intermittent period based on the packet size of each initiator with respect to each of the targets and initiators that are destinations.

The intermittent information generator calculates the intermittent period with respect to each of the targets that are destinations.

In a controller according to any of the embodiments described above, the communications circuitry uses, as a time to transmit the data supplied from the initiator, the value of a counter which counts the number of periods of a clock signal in the system.

In a controller according to any of the embodiments described above, the communications circuitry includes a counter which counts the number of periods of a clock signal in the system, resets the counter at a time to transmit the data supplied from the initiator, and provides the count of the counter as passed time information for the transmission interval setting circuitry. And the transmission interval setting circuitry sees if the passed time information has reached either the intermittent period information or a predetermined count and sends transmission permission responsive to the transmission request from the initiator.

In a controller according to any of the embodiments described above, if the initiator is sending a series of access requests continuously to the target, the transmission interval setting circuitry transmits the access request to the target at regular intervals in the period specified by the intermittent period information.

A method according to another aspect of the present invention is a system design method for determining the bus frequency of a system in which initiators and targets are connected together via distributed buses. The method includes the steps of: generating an intermittent period in which interference between packets is able to be restricted based on system configuration information about the system's configuration and flow configuration information indicating, on a flow basis, a specification required for each initiator to access one of the targets, the system configuration information and the flow configuration information having been collected in advance; calculating a maximum latency involved to transmit or receive a packet based on at least the intermittent period; and determining the lowest bus operating frequency under the condition that the maximum latency does not exceed the shortest permissible latency of any of the initiators.

Hereinafter, exemplary embodiments of a controller according to the present disclosure will be described with reference to the accompanying drawings.

A controller according to the present disclosure is used in a system in which initiators and targets are connected together via distributed buses to control the transmission timing of an access request that has been received from any of the initiators through the buses.

This controller includes an intermittent information generator or storage, a clock generator, communications circuitry and transmission interval setting circuitry.

The intermittent information generator generates intermittent information based on system configuration information about a system's configuration and flow configuration information indicating, on a flow basis, a specification required for each initiator to access one of the targets. The intermittent information includes information about an intermittent period in which interference between packets is able to be restricted and bus operating frequency information indicating the lowest bus operating frequency at which real-time performance of each initiator can be guaranteed. If an intermittent information storage is provided instead of the intermittent information generator, the intermittent information storage stores intermittent information that has been generated by the designer of the system.

The clock generator generates a clock signal by reference to the bus operating frequency information. The communications circuitry operates in response to the clock signal, packetizes and transmits input data, and records the transmission time of the input data. The transmission interval setting circuitry sets the time to send transmission permission responsive to the transmission request based on the intermittent period, the time when the transmission request from the initiator is detected, and the previous transmission time.

According to this configuration, the controller can restrict the interference of packets between respective initiators. Hereinafter, it will be described more specifically with reference to the accompanying drawings how this controller works.

Figure 10:
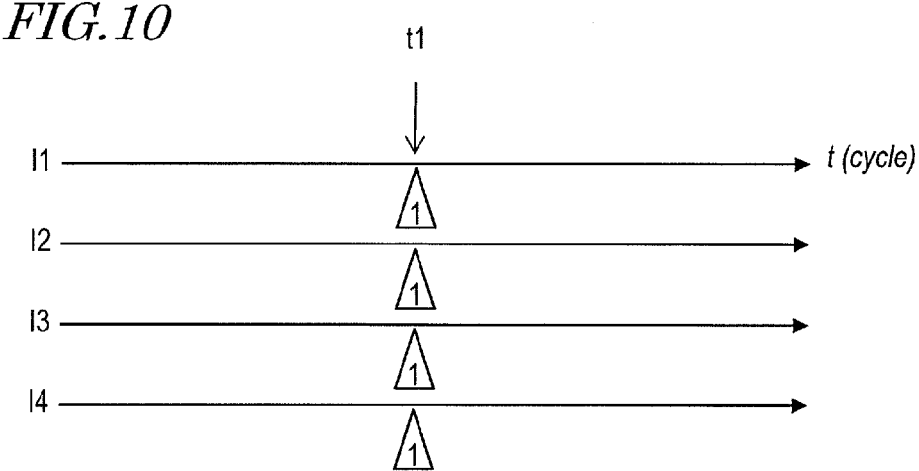
FIG. 10 shows how all initiators I1 through I4 transmit packets of the largest packet sizes N1 through N4 to the same target T1 at the same time t1.
Figure 11:
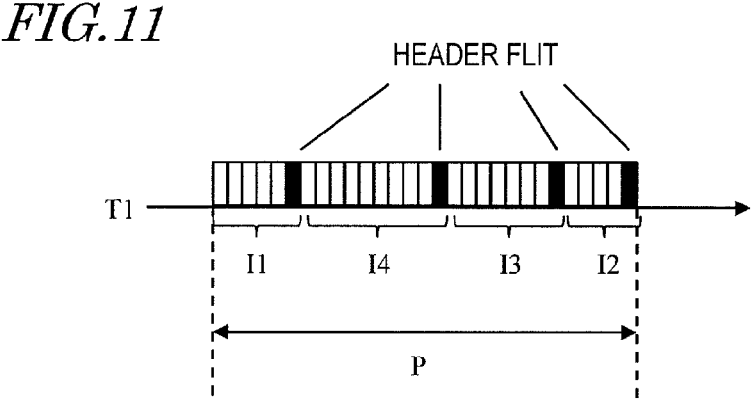
FIG. 11 shows how the respective packets headed to the target T1 arrive one after another.

FIG. 10 shows how all initiators I1 through I4 transmit packets of the largest packet sizes N1 through N4 to the same target T1 at the same time t1. FIG. 11 shows how the respective packets headed to the target T1 arrive one after another. If there are no interfering packets other than the packets that have been transmitted at the same time by the initiators I1 through I4, every packet should arrive within P cycles. FIG. 11 shows timing in a situation where each of those initiators has transmitted succeeding packets that the initiator requires at transmission intervals of P cycles or more.

Figure 12:
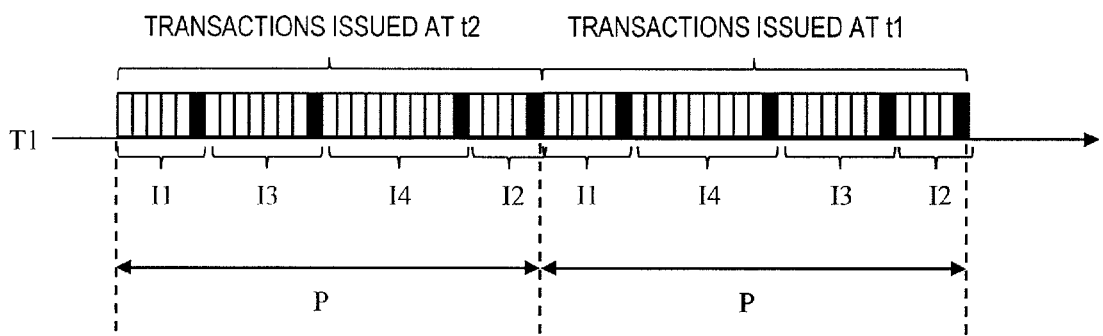
FIG. 12 shows timings when the flits generated as a result of these transactions are received at the memory T1.

FIG. 12 shows how the respective packets arrive at the target T1 one after another. As can be seen from FIG. 12, if each initiator transmits packets at transmission intervals of P cycles or more, there will be no interference between the packet transmitted for the first time and the packet transmitted for the second time, and therefore, the latency due to the interference can be limited to P cycles or less.

Also, to make sure that the actual latency is at most equal to or shorter than what is permitted to each initiator, attention needs to be paid to an initiator to which the shortest latency is permitted. The condition on the latency becomes strictest if the packet transmitted by the initiator I1, to which the shortest latency is permitted in the intended packet arrival order shown in FIG. 11, arrives later than any other packet. The bus should be driven at the lowest bus operating frequency at which the actual latency can still be equal to or shorter than the longest permissible latency S specified by the initiator I1 even under such a condition.

Figure 13:
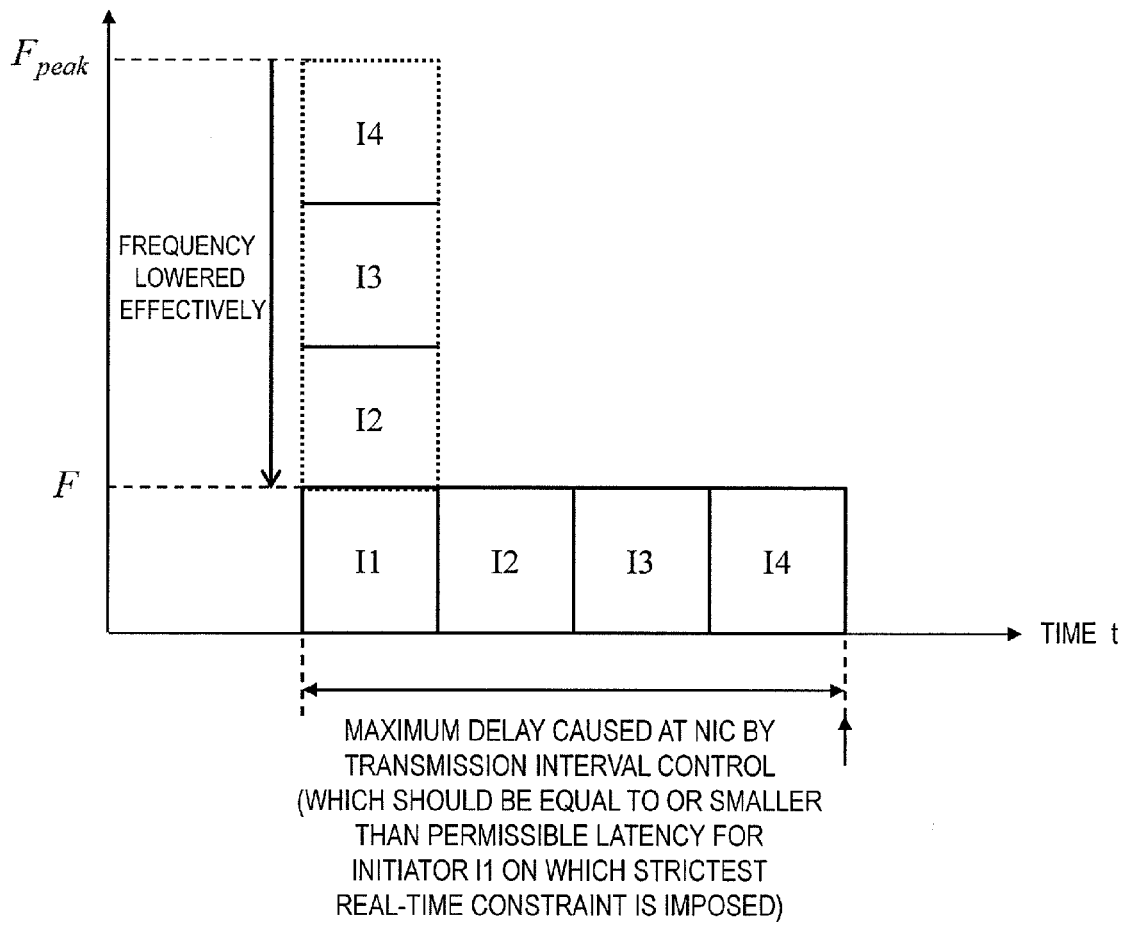
FIG. 13 shows how effectively the operating frequency can be lowered.

FIG. 13 shows how effectively the operating frequency can be lowered. By setting the packet transmission interval to be P cycles or more, the maximum required band can be cut down, because there are no packets to be issued at intervals that are shorter than P cycles. In FIG. 13, the solid line rectangle indicates the bands required by the respective initiators in a situation where the transmission interval control of the present disclosure has been carried out. The dotted line rectangle is drawn to be compared to FIG. 5. If attention is paid to the initiator I1 to which the shortest latency is permitted, a delay is caused in the time direction, but its maximum required band is cut down, by setting the packet transmission interval to be P cycles or more. In addition, since the amount of delay in the time direction is determined so as to satisfy the initiator's (I1) permissible latency constraint, the real time performance of each initiator is not affected. The sum of the respective areas of the solid-line and dotted-lines rectangles associated with each initiator indicates the size of the data transmitted by the initiator, and those areas are equal to each other. As can be seen, according to the present disclosure, the lowest required bus operating frequency can be determined with the transmission performance of each initiator guaranteed.

Hereinafter, first through third embodiments of a controller according to the present disclosure will be described.

Embodiment 1

First of all, the mode communications between the initiators I1 through I4 and the targets T1 through T4 shown in FIG. 1 and their elements will be described. FIG. 1 illustrates an ordinary connection pattern to be adopted in a situation where an NoC is used as a main bus between the initiators I1 through I4 and the targets T1 through T4. This configuration can be used in not only this embodiment but also the embodiments to be described later as well. In the following description of this embodiment, the respective initiators I1, I2, I3 and I4 are supposed to be processors that carry out real-time processing and the respective targets T1, T2, T3 and T4 are supposed to be memory controllers. However, this is just an example of the present disclosure.

The initiator may be any device as long as it can operate as a bus master. Examples of such initiators include a DSP (digital signal processor), a CPU (central processing unit), an ASIC (application specific IC), a DMAC (direct memory access controller) and an input/output port connected to any of various devices.

Likewise, the target may also be any device as long as it can operate as a bus slave. Examples of such targets include a DRAM controller to be connected to an external DRAM, an SRAM, a buffer memory functioning as an input/output buffer for an external device, and an input/output port connected to any of various devices.

The processors I1, I2, I3 and I4 carry out access request transactions with the memories T1, T2, T3 and T4 in accordance with the allocations defined by the program being executed and a memory map. In this description, attention will be paid to access to the target T1 for the sake of simplicity.

The processors I1 through I4 guarantee the performance of an operation program which needs to be executed by the processors themselves and needs to have its performance evaluated. Thus, in order to read and write data from/on the memory T1 at an appropriate timing, the processors I1 through I4 attempt to issue access request transactions with respect to NIC1 through NIC4. In this example, the maximum sizes of the data that needs to be used by the processors I1, I2, I3 and I4 to gain access to the memory T1 once will be identified herein by N1, N2, N3 and N4 (in bytes), respectively.

As the requests to access the memory T1 will be issued by the respective processors I1, I2, I3 and I4 at varying intervals in general, the average access intervals will be identified herein by A1, A2, A3 and A4, respectively. Meanwhile, the permissible latencies specified by I1, I2, I3 and I4 to carry out real-time processing will be identified herein by S1, S2, S3 and S4, respectively. The permissible latency Si (where i=1 to 4) refers herein to the longest period of time for which a processor Ii (where i=1 to 4) can possibly wait since the processor Ii attempted to issue a memory access request transaction and until the processor Ii receives a reply transaction in response to the request transaction. A1 through A4 and S1 through S4 have time units but may also be converted into bus cycle units by the following Equations (3) and (4):

$$Ai' = F \times Ai \text{ (cycles)} \quad (3)$$

$$Si' = F \times Si \text{ (cycles)} \quad (4)$$

where F indicates the bus operating frequency (Hz).

Next, the topology of the NoC bus shown in FIG. 1 and its various elements will be described. In FIG. 1, NIC1 through NIC0 on the initiator end and NIC5 through NIC8 on the target end are coupled together so as to be able to communicate with each other via Routers R1 through R4 which are connected together by a so-called "butterfly net" topology. However, this is only an example of the present disclosure. Alternatively, the topology of the router net may also be a mesh net, a tree net, a ring net, a star net, a torus net, or a three-dimensionally expanded version of any of these various nets.

Each of NIC1 through NIC8 performs bus protocol processing so that an initiator and a target that are connected together can interface with each other, packetizing processing and de-packetizing processing to transmit and receive data to/from an NIC on the other end, and flitizing processing and de-flitizing processing to transmit and receive data to/from the router connected to itself. As a fixed number of processing cycles are needed to get those kinds of processing done, the number of cycles to be consumed by an NIC will be identified herein by N. Meanwhile, each of the routers R1 through R4 performs buffer management processing to transmit and receive flitized data to/from an NIC connected to itself or an adjacent router and output port switching processing, for example. As a fixed number of processing cycles are needed to get those kinds of processing done, the number of cycles to be consumed by a router will be identified herein by R.

In FIG. 1, any request transaction issued by a processor should pass through two NICs and two routers and any reply transaction should also pass through two NICs and two routers. That is why the number C of cycles of the latency involved in a fixed manner with a set of access request and reply transactions is represented by the following Equation (5):

$$C = 2 \times (2 \times N + 2 \times R) \text{ (cycles)} \quad (5)$$

Equation (5) shows how to calculate the number of cycles in a situation where the routers are arranged in two stages, no matter what route is taken. On the other hand, in the case of a system configuration in which the number of NICs or routers to pass through on a route leading from an initiator to a target varies from one route to another, the respective numbers of NICs and routers may be added to the system configuration. Then, the fixed latency value can be calculated when each initiator is accessing any of the targets.

The latency caused when a processor actually accesses a memory varies according to not only the number C of cycles of the latency but also the number of cycles of a wait for another packet on either a router or an NIC. Supposing the variation is indicated by V, the overall latency Z involved since a processor issued a request transaction and until the processor receives a reply transaction in response to the request transaction is represented by the following Equation (6):

$$Z = C + V \text{ (cycles)} \tag{6}$$

To get the access done so that the permissible latency specified by a processor is within S seconds, the bus operating frequency F (Hz) needs to be determined by the following Inequality (7):

$$S \times F \geq C + V \tag{7}$$

However, the overall latency Z varies according to the degree of interference with another access transaction. That is why the bus operating frequency F cannot be estimated quantitatively and the real-time processing required by the processor cannot be guaranteed.

According to this embodiment, however, the overall latency Z can be estimated quantitatively and the lowest required bus operating frequency F at which the system can operate can be designed. And the intervals at which access transactions are issued by a processor are controlled dynamically, the maximum value of the latency V varying with the wait is defined, and the bus is driven at the operating frequency that satisfies Inequality (7), thereby designing the bus band non-wastefully and saving as much power as possible.

Next, it will be described with reference to FIGS. 10 and 11 and FIG. 14 how to control the timings of access transactions issued by the respective processors in the configuration shown in FIG. 1.

FIG. 10 illustrates a situation where the processors I1 through I4 shown in FIG. 1 have issued Request Transaction #1 with the maximum size Ni at the same time with respect to the same memory T1. In that case, the request transactions issued by I1 through I4 involve a wait on the bus. FIG. 11 shows how the packets arrive one after another at the memory T1, for example.

On the condition that one flit should be transmitted in one cycle, the number $P1(i)$ of cycles it takes for the memory T1 to receive the packet representing the transaction issued by the processor Ii is calculated by the following Equation (8):

$$P^{(i)} = \frac{H + L_i}{W} \text{ (cycle)} \tag{8}$$

where H indicates the size (in bytes) of the packet's header, Li indicates the maximum size (in bytes) of the transactions issued by the processors Ii, and W indicates the bus' width (in bytes). Equation (8) represents the number of cycles to be consumed by the data that has been transmitted by the processors Ii at the same time. That is why if the processors Ii have generated z transactions at the same time, the value on the right side of Equation (8) is also multiplied by z.

The number P of cycles it takes for the memory T1 to receive all of the four request transactions that have been issued at the same time by the processors I1 through I4 is represented by the following Equation (9):

$$P = \sum_i P^{(i)} \text{ (cycle)} \tag{9}$$

Figure 14:
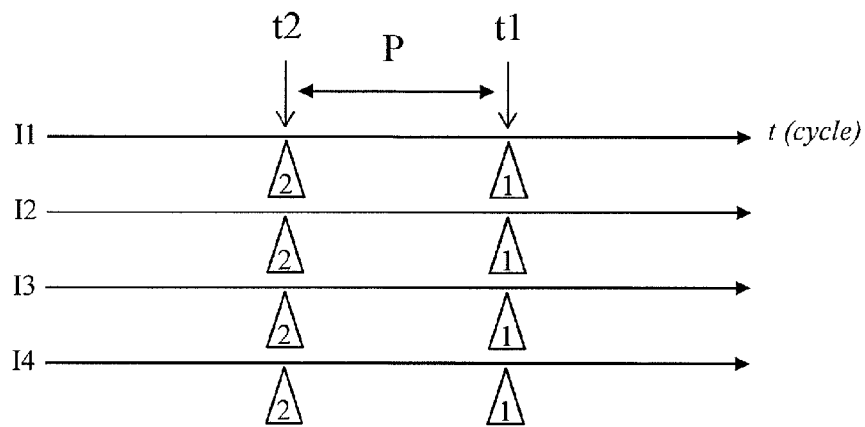
FIG. 14 shows a timing diagram illustrating a situation where each processor Ii has issued Request Transactions #1 and #2 at an interval represented by the number P of cycles.

FIG. 14 is a timing diagram illustrating a situation where each processor Ii has issued Request Transactions #1 and #2 at an interval represented by the number P of cycles. On the other hand, FIG. 12 shows when the flits generated as a result of these transactions are received at the memory T1. The four Request Transactions #1 that have been issued at the same time t1 by I1 through I4 are received by the memory T1 in the order of I2, I3, I4 and I1. And the four Request Transactions #2 that have been issued at the same time t2 after the interval of P cycles by I1 through I4 are received by the memory T1 in the order of I2, I4, I3 and I1. According to the order in which the transactions issued at the time t1 are received by the memory T1 and the order in which the transactions issued at the time t2 are received by the memory T1, a wait may be caused and the latency Z as viewed from each of those processors may vary. However, the magnitude of that variation V is no more than P. In addition, as the transactions are issued at the time t2 P cycles after the transactions were issued at the time t1, no wait should be caused between these two groups of transactions. That is to say, right after the transaction that has arrived at the memory T1 later than any other transaction issued at the time t1 has been received fully, the transaction that has arrived at the memory T1 earlier than any other transaction issued at the time t2 starts to be received. For that reason, Inequality (7) mentioned above can be replaced with the following Inequality (10). By driving the bus at the lowest bus operating frequency F at which the following Inequality (10) is satisfied with respect to every processor Ii and by controlling the processors so that the transaction issuing interval of each processor becomes at least equal to P cycles, the frequency can be designed with the real-time performance guaranteed for every processor:

$$Si \times F \geq C + P \tag{10}$$

Figures 15, 16:
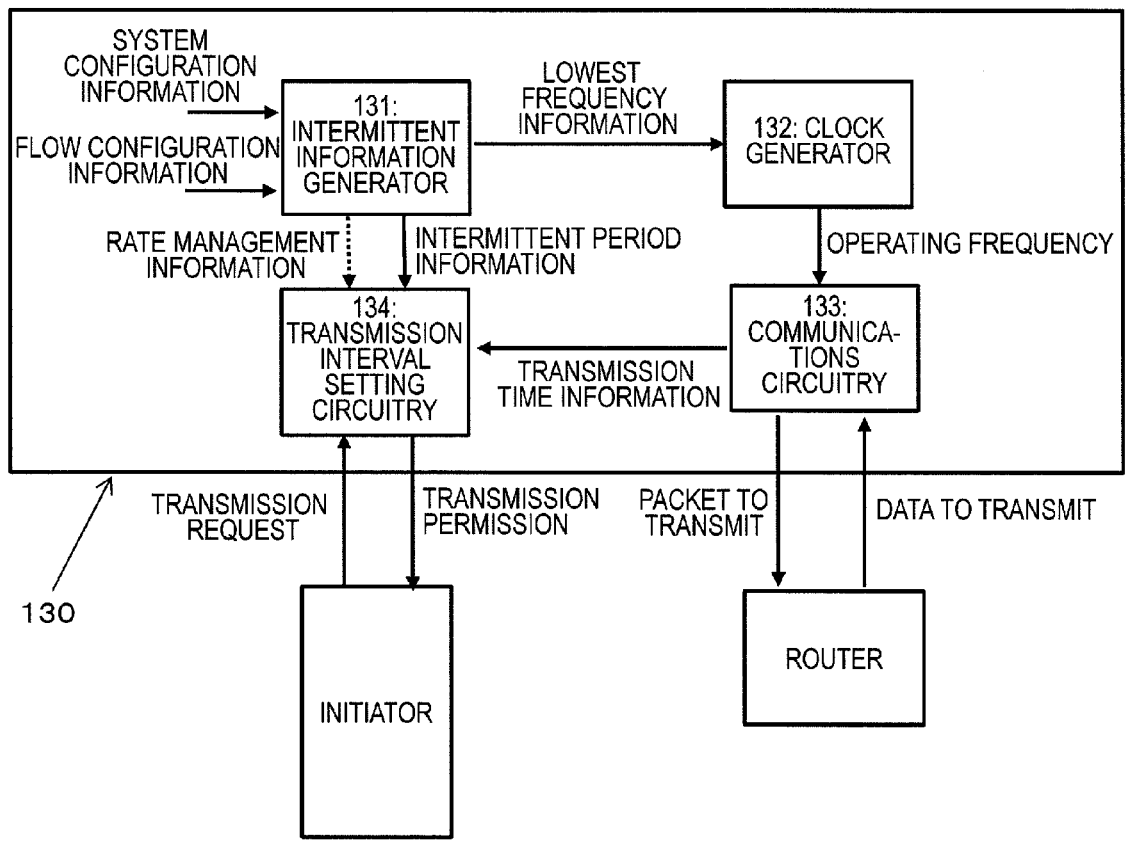
FIG. 15 illustrates a basic configuration for an NIC 130 on the initiator (processor) end.
FIG. 16 shows an example of the system configuration information.

FIG. 15 illustrates a basic configuration for an NIC 130 on the initiator (processor) end. The NIC 130 may be any of NICs 1 through 4 shown in FIG. 1, for example. It should be noted that the NIC 130 will be sometimes referred to herein as a "transmission interval controller" or simply a "controller" in view of its functions to be described below.

Hereinafter, a configuration for a controller 130 according to this embodiment will be described.

The controller 130 includes an intermittent information generator 131, a clock generator 132, communications circuitry 133 and transmission interval setting circuitry 134.

The intermittent information generator 131 generates information about an intermittent period P in which interference between packets can be restricted, and determines the lowest bus operating frequency F at which real-time performance can be guaranteed and which is defined by the permissible latencies S1 through S4 specified by the respective processors I1 through I4, based on system configuration information and flow configuration information of the respective processors I1 through I4.

The clock generator 132 generates the bus operating frequency based on the lowest frequency F.

The communications circuitry 133 operates using the operating frequency F as a bus clock frequency, outputs an input request transaction as a packet to transmit, and records the transmission time of the previous request transaction.

The transmission interval setting circuitry 134 sets the time to send transmission permission responsive to the transmission request based on the intermittent period information P, the time when the transmission request has been detected, and the previous transmission time.

Hereinafter, it will be described in detail how each of these processing sections of this basic configuration operates.

(Intermittent Information Generator 131)

The intermittent information generator defines intermittent information based on system configuration information and flow configuration information that have been defined in advance. The intermittent information includes intermittent period information P about a period in which interference between packets can be restricted and the lowest bus operating frequency F at which the real-time performance of the processor can be guaranteed.

The system configuration information is information about a system comprised of initiators, buses, routers and targets as shown in FIG. 1, for example. FIG. 16 shows an example of the system configuration information. The "bus width W" indicates the bus width of each link of the NoC and is expressed in bytes. A data signal with a width of W bytes can be transmitted in one cycle, and therefore, W is equivalent to the size of a flit. The "NIC and router processing delays" indicate the fixed numbers of processing cycles to be consumed by packet transfer and other kinds of processing in the NIC and the router. The "packet header size" is generally suitably a multiple of W because if the packet's header and payload are divided into flits, the processing can be done more easily by the NIC and the routers. And the "bus operating frequency (initial value) F0" is the initial value when the lowest bus operating frequency to drive the bus is determined.

On the other hand, the flow configuration information is information about the specification that is needed for each initiator (such as a processor) to access a target (such as a memory) and that is represented on a task by task basis or on a flow (such as memory allocation) basis. FIG. 17 shows an example of the flow configuration information. In the example shown in FIG. 17, two flows are defined for each of the processors I1 through I4 that are initiators. For example, the processor I1 may have a virtualization function, two kinds of OS may run on each virtual machine, and the access requested by each OS may be managed with flow IDs 12 and 21. In another example, if the areas of two memories T1 and T2 are allocated by a memory map that is defined with respect to the processor I2, the flow IDs 21 and 22 may be regarded as being associated with those areas.

According to the flow configuration information, the degree of necessity to guarantee performance, the node ID of a memory as the access destination, the maximum size (in bytes) of the access transaction, the average access interval (in seconds), the permissible latency value (in seconds) that is the time constraint of real time processing, the rate ensured period (in seconds) and other factors representing the characteristics of the flow are defined with respect to each of the flows that are defined for each processor. Meanwhile, as the processor I4 is an example of a processor that does not perform real-time processing and that does not have to have its performance guaranteed, no average access interval or permissible latency is defined with respect to the processor I4. Examples of such processors include a processor that is in charge of transferring a file on the back end. In the example shown in FIG. 17, the other three processors I1 through I3 need to have their performance guaranteed and there are six flows with flow IDs 11 through 32.

Now it will be described how to obtain an intermittent interval P1 with respect to the memory T1. FIG. 18 shows the three flows, of which the performances with respect to the memory T1 need to be guaranteed and which are extracted from FIG. 17. The intermittent interval P1 at which the interference of packets between the processors can be restricted with respect to the memory T1 is calculated by Equations (8) and (9) and the following Equation (11) in combination:

$$P_1 = \sum_{i=1}^{3} \frac{H + L_i}{W} \text{ (cycle)} \tag{11}$$

FIG. 19 shows the flow configuration information of the initiators I1 through I3 which appoint the memory T2 as their destination. The intermittent interval P2 with respect to the memory T2 can also be calculated in the same way as P1 by the following Equation (12) and by reference to FIG. 19:

$$P_2 = \sum_{i=1}^{3} \frac{H + L_i}{W} \text{ (cycle)} \tag{12}$$

The lowest bus operating frequency F (Hz) needs to be a value at which a sufficiently high rate and a sufficiently short latency are ensured with respect to every flow that needs to have their performance guaranteed and that appoints the memory T1 or T2 as their destination. That is why the intermittent information generator 131 uses F0 as an initial value of frequency search to obtain the lowest bus operating frequency F, thereby determining the frequency F1 at which the performance can be guaranteed with respect to the flow associated with the memory T1 and the frequency F2 at which the performance can be guaranteed with respect to the flow associated with the memory T2. And the intermittent information generator 131 defines the larger one of these two frequencies F1 and F2 to be the bus operating frequency F. In this manner, the performance can be guaranteed with respect to the flows associated with all of the memories. Hereinafter, it will be described how the intermittent information generator 131 obtains the lowest operating frequency F1 with respect to the memory T1.

The performance-guaranteed flow that appoints the memory T1 as its destination may have its transmission put on hold for P1 cycles at most, because the transmission interval setting circuitry 134 restricts interference with succeeding access packets. However, even if its transmission is put on hold for P1 cycles at most, the access can still be done at the average rate and the necessary condition on the flow 11 to avoid exceeding the permissible latency is given by the following Inequality (13):

$$P_1 \le \min\{F_0 \cdot A_{11} - C_1, F_0 \cdot S_1 - C_1\} \tag{13}$$

where C1 is the fixed latency calculated by Equation (5) mentioned above.

Also, the maximum latency involved by interference with packets that have been transmitted from NIC1 after the request transaction on the flow 11 was put on hold for at most P1 cycles and that have been transmitted at the same time from other processors becomes P1 cycles as can be seen from Equation (10). That is why if the access transaction belonging to the flow 11 should not exceed the permissible latency S1 specified by the processor I1, the following Inequality (14) needs to be satisfied:

$$2P_1 \le F_0 \cdot S_1 - C_1 \tag{14}$$

Considering these Inequalities (13) and (14), the following Inequality (15) should be satisfied in order to guarantee the performance with respect to the flow 11:

$$P_1 \le \min\left\{F_0 \cdot A_{11} - C_1, \frac{F_0 \cdot S_1 - C_1}{2}\right\} \quad (15)$$

Unless this Inequality (15) is satisfied, the operating frequency F0 should be increased to the point that it is satisfied. There is the lowest operating frequency F11 that satisfies Inequality (15) and that becomes the lowest bus operating frequency value at which the performance can be guaranteed with respect to the flow 11. In the same way, the intermittent information generator 131 determines the lowest bus operating frequencies F21 and F31 at which the performance can be guaranteed with respect to the other flows 21 and 31 that appoint the memory T1 as their destination. The following Equation (16) can be used to obtain the lowest bus operating frequency F1 at which the performance can be guaranteed with respect to every flow that appoints the memory T1 as its destination:

$$F_1 = \max\{F_{11}, F_{21}, F_{31}\} \text{ (Hz)} \quad (16)$$

By adopting the same method as what has been used for the memory T1, the lowest bus operating frequency F2 at which the performance can be guaranteed with respect to every performance-guaranteed flow 12, 22, 32 that appoints the memory T2 as their destination can be obtained by reference to FIG. 19 and Equation (12). Using F1 and F2, the system's lowest bus operating frequency F is determined by the following Equation (17):

$$F = \max\{F_1, F_2\} \text{ (Hz)} \quad (17)$$

The frequency F thus determined is output as the lowest frequency to the clock generator 132.

Hereinafter, it will be described how to calculate rate management information based on the lowest bus operating frequency F thus determined. By being multiplied by F, the rate ensured period g1 of the processor I1 can be converted into a value G1 in cycles. Also, the average number M1 of times of accesses to the memory T1 within the G1 cycles becomes g1/A11. On the other hand, the average number M2 of times of accesses to the memory T2 becomes g1/A12. The intermittent information generator 131 calculates the value G1 representing the rate ensured period and the average numbers M1 and M2 of times of accesses to all destination memories and provides the transmission interval setting circuitry 134 with these pieces of rate management information. As can be seen easily from this description, the intermittent information generator 131 calculates the rate management information after having obtained the lowest bus operating frequency F. Thus, it can be said that the rate management information is secondary information. In FIG. 15, the dotted arrow indicates that the rate management information is obtained as such secondary information.

Figure 20:
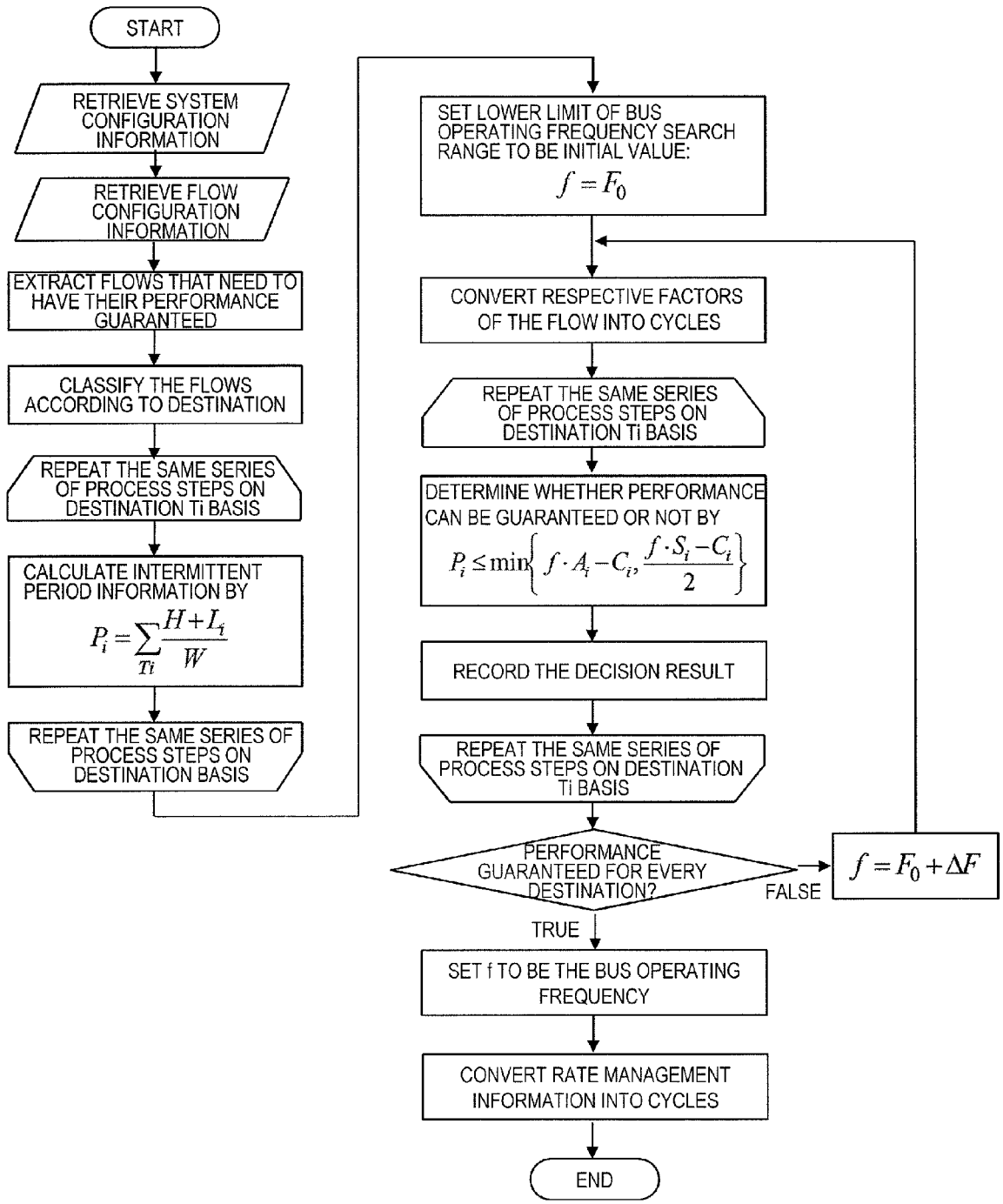
FIG. 20 shows the procedure of the processing performed by the intermittent information generator 131.

FIG. 20 shows the procedure of the processing performed by the intermittent information generator 131. As these processing steps have already been described, they will not be described all over again to avoid redundancies.

(Clock Generator 132)

The clock generator 132 generates a clock signal, of which the frequency is the lowest frequency value F (Hz) that has been determined by the intermittent information generator 131. The clock signal is supplied as operating clock pulses to NICs, routers and other bus elements through clock lines such as a clock tree on a chip.

(Communications Circuitry 133)

The communications circuitry 133 receives a request transaction as transmitted data through the bus that is interfaced with the processor end, packetizes the data into request packets, and transmitted the packets on a flit basis to the bus that is interfaced with the router end. And the communications circuitry 133 notifies the transmission interval setting circuitry 134 of the time when the header flit of each request packet was transmitted to the router end and the destination memory as transmission time information.

(Transmission Interval Setting Circuitry 134)

The transmission interval setting circuitry 134 adds, to a management table, the intermittent period information and rate management information provided by the intermittent information generator 131 and the destination-by-destination transmission time information provided by the communications circuitry 133. The management table may be stored in an internal memory (not shown) in the transmission interval setting circuitry 134. The transmission interval setting circuitry 134 controls the timing to accept the request transaction from the processor, thereby controlling the transmission interval.

Figures 21, 22:
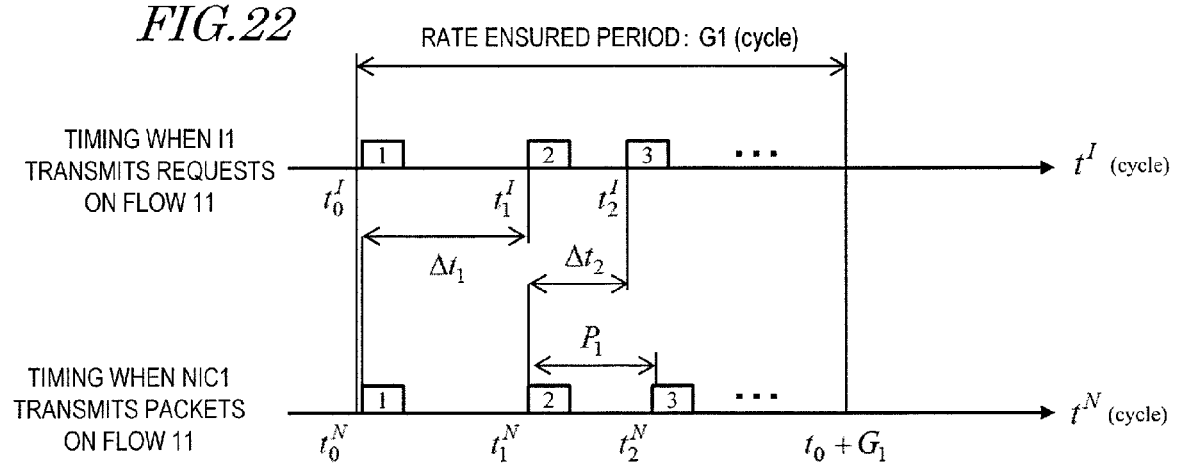
FIG. 21 shows an exemplary format for a management table for NIC1 that is connected to the processor I1.
FIG. 22 illustrates how the NIC1 accepts the access transactions requested by the processor I1 the average number M1 of times of accesses or less.

FIG. 21 shows an exemplary format for a management table for NIC1 that is connected to the processor I1, which uses the memories T1 and T2 as destination memories with respect to the flows 11 and 12, respectively. As for the destination memory T1, stored are various factors about the band required by the processor that transmits request transactions M1 times during the period of G1 cycles, the value of the intermittent period information P1 (in cycles) that is the shortest transmission interval to secure to restrict interference with the last request packet that has just been transmitted and the next request packet to be transmitted soon, transmission time information J1 that is information about the transmission time of the last request transaction, m1 representing the count of request transactions that have actually been transmitted during the rate ensured period of G1 cycles, and D1 that is information about the time when the request transaction that is currently put on hold by controlling the transmission interval is to be transmitted. D1 will also be referred to herein as "next transmission time information D1". As the transmission time information J1 and the next transmission time information D1, system clock pulses to count the bus operating frequency F (Hz) may be used. In that case, the transmission time information J1 and the next transmission time information D1 are expressed in cycles. That is to say, by using a counter value obtained by counting the period of the clock signal in the system as the transmission time of the data provided by the initiator, the transmission interval can be set.

Next, it will be described, just as an example, how the transmission interval setting circuitry 134 adjusts the timing of access requested by NIC1 in a situation where the processor I1 issues request transactions to access the memory T1. FIG. 22 illustrates how the NIC1 accepts the access transactions requested by the processor I1 the average number M1 of times of accesses or less. The rate ensured period begins at the time t0, and accesses are requested M1 times during the period of G1 cycles until the time t0+G1. As a result, the processor I1 operates to ensure the rate. The rate ensured period G1, the average access interval M1, and the intermittent period information P on the management table are never changed during the rate ensured period. On the other hand, the transmission time information J1, the number m of times of accesses, and the next transmission time information D1 are supposed to be changed sequentially as state variables to control the transmission interval.

By the point in time t0 when the rate ensured period begins, the transmission time of the request transaction that was transmitted last time from NIC1 to the destination T1 during the previous rate ensured period which began at a time t0−G1 has been added to the transmission time information J1. Also, the number m1 of times of accesses has been reset into zero by the time t0. In FIG. 22, the access transactions requested by the processor I1 with respect to the memory T1 during the rate ensured period that begins at the time t0 are numbered 1, 2, 3 and so on. When an access is requested from the fourth time and on, the processing will be performed in the same way until the number of times reaches M1. The request transaction #1 requested by the processor I1 is transmitted at the same time as a request packet from NIC1. As a result, the number m1 of times of accesses becomes equal to one, and its transmission time t0 is added to the transmission time information J1. The next transaction #2 requested by the processor I1 is accepted immediately and transmitted from NIC1 because Δt1 that is the time difference between the request time t1(I) and the transmission time information J1 is equal to or longer than the intermittent period information P1. As a result, the number m1 of times of accesses becomes equal to two, and the time is added to the transmission time information J1. The next transaction #3 requested by the processor I1 is put on hold because Δt2 that is the time difference between the request time t2(I) and the transmission time information J1 is less than the intermittent period information P1. Then, the next transmission time information D1 is determined by the following Equation (18) and added to the management table:

$$D1 = J1 + P1 \tag{18}$$

In the example illustrated in FIG. 22, by reference to the next time information D1, the request transaction #3 is transmitted from NIC1, and m1 becomes equal to three, and its transmission time is added to the transmission time information J1. Since the interval at which request packets are transmitted from NIC1 can be at least P1 cycles, interference between the last and next request packets can be restricted.

Suppose a situation where only the processor I1 is accessing continuously the memory T1 but the other processors are not accessing any memories.

Figure 23:
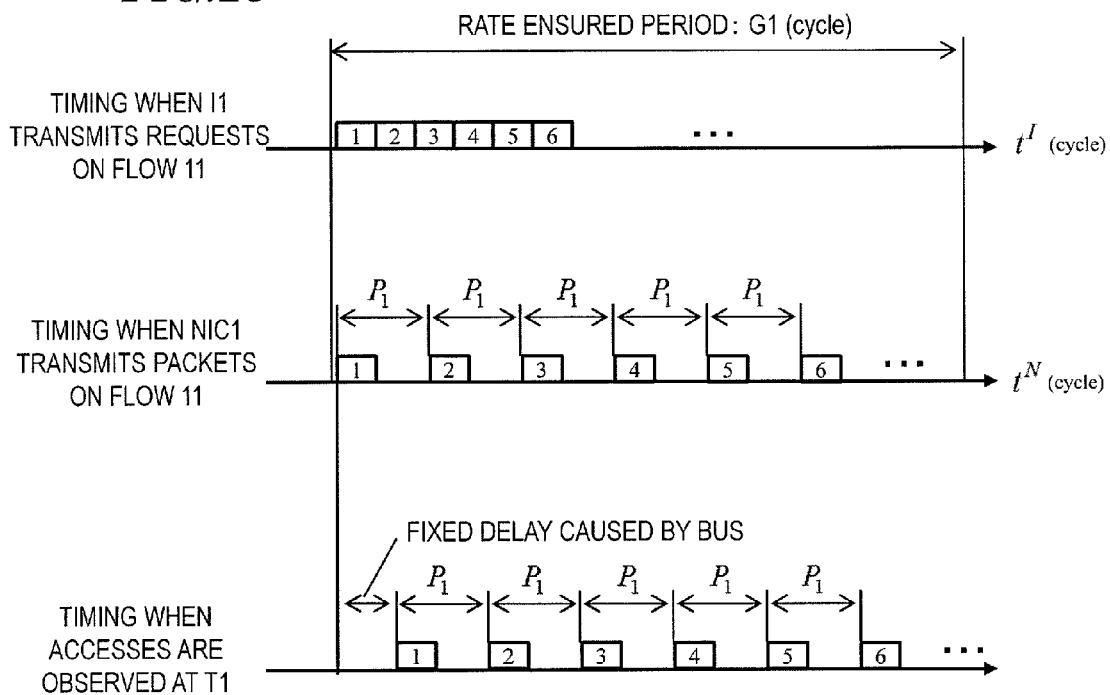
FIG. 23 shows the times when those access requests are transmitted from NIC1, and the times when the accesses to the memory T1 are observed in a situation where only the processor I1 is accessing continuously the memory T1 but the other processors are not accessing any memories.

FIG. 23 shows the times when continuous requests are issued by the processor I1, the times when those access requests are transmitted from NIC1, and the times when the accesses to the memory T1 are observed. When the continuous access requests issued by the processor I1 pass through NIC1, the transmission interval setting circuitry 134 converts those access requests into access requests at regular intervals as indicated by the intermittent period information P1. As no other processors are accessing any memories now, the accesses to the memory T1 will also be observed at regular intervals if there is no resource contention at any router.

Also, if the number of access requests accepted by NIC1 should be limited to M1 times or less during the rate ensured period of G1 cycles as opposed to the number of access requests issued by the processor I1, then the average number M1 of times of accesses and the number m1 of request transactions transmitted from NIC1 may be compared to each other.

Figure 24:
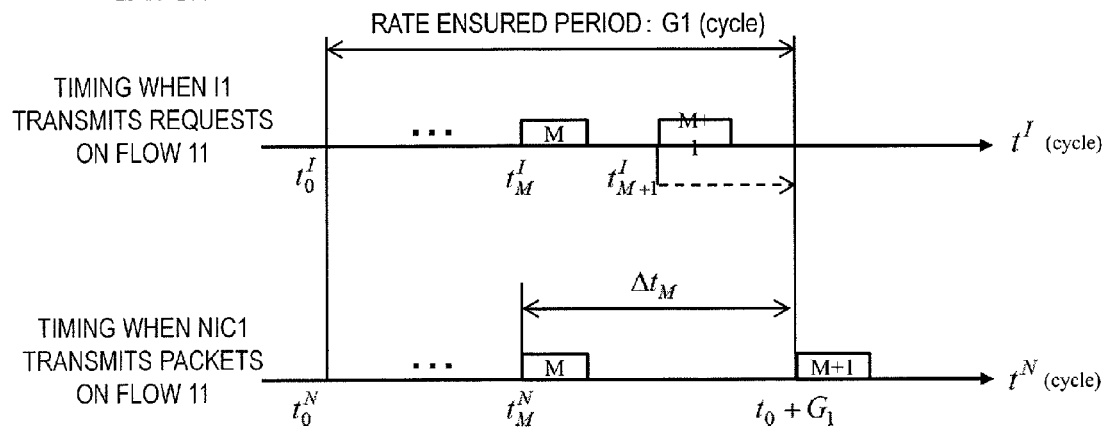
FIG. 24 illustrates how the transmission interval is adjusted by NIC1 in a situation where request transactions are transmitted from the processor I1 more than the average number M1 of times of accesses as recorded on the management table.

FIG. 24 illustrates how the transmission interval is adjusted by NIC1 in a situation where request transactions are transmitted from the processor I1 more than the average number M1 of times of accesses as recorded on the management table. The access transaction requested by the processor I1 with respect to the memory T1 at the time tM(I) is transmitted at a time tM(N) from NIC1 as a result of the control that has already been described with reference to FIG. 22, and m1=M1 and J1=tM(N) are written on the management table. Next, if an access is requested for the (M+1)$^{th}$ time during the same rate ensured period, D1 on the management table is updated by the following Equation (19) so that the next transmission time becomes the next rate ensured period as the condition m1=M1 is already satisfied:

$$D1 = t0 + G1 \tag{19}$$

In order to prevent the flow 11 on which access requests are issued excessively more than M1 times during the rate ensured period G1 from depriving the other flows of their allocated bands, the function of limiting the actual number of times of accesses to M1 or less is required.

Figure 25:
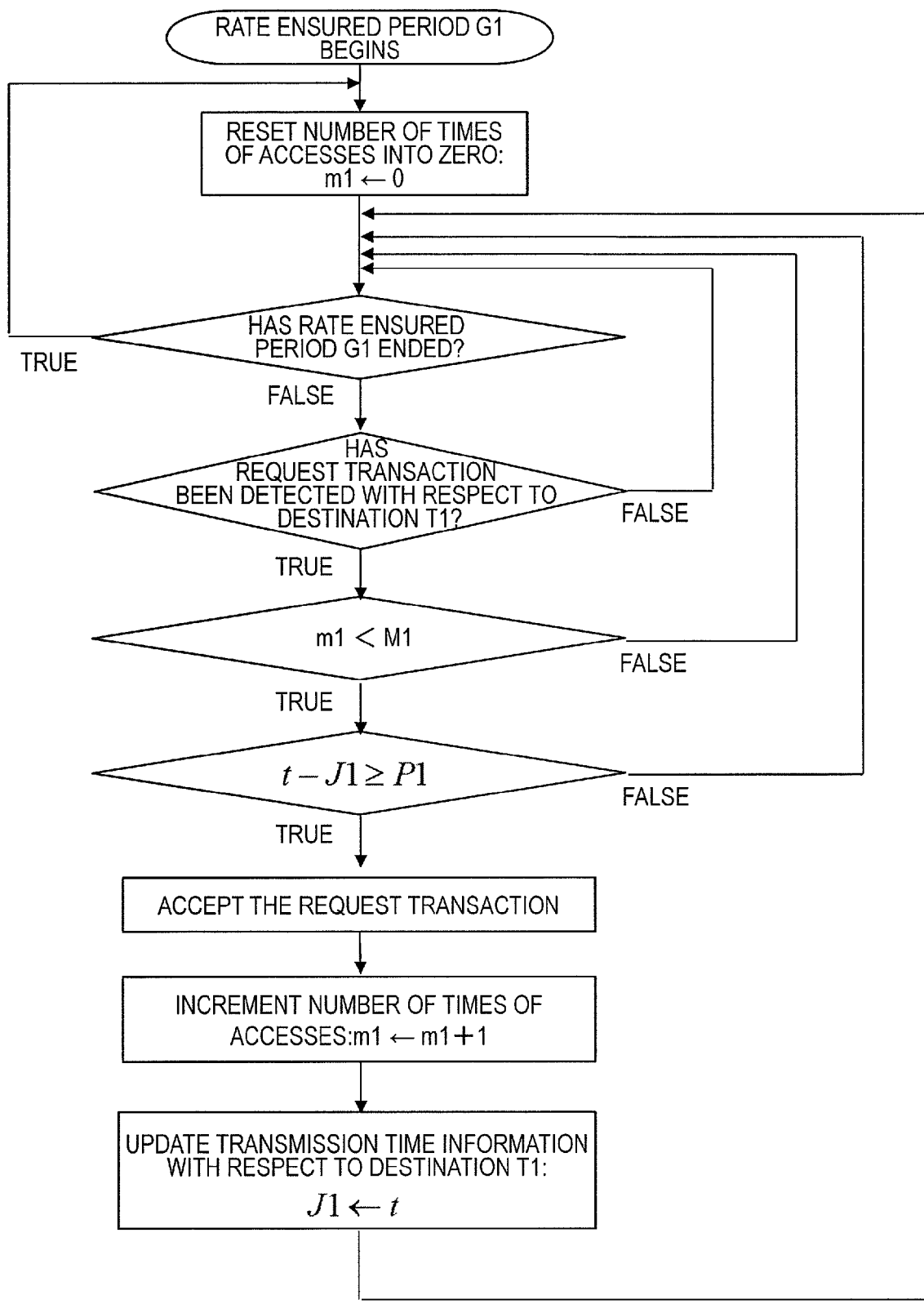
FIG. 25 shows the procedure of the processing performed by the transmission interval setting circuitry 134.

FIG. 25 shows the procedure of the processing performed by the transmission interval setting circuitry 134. As these processing steps have already been described, they will not be described all over again to avoid redundancies.

According to such a configuration, the performance of an initiator can be guaranteed at the lowest bus operating frequency. In the embodiment described above, a number of memories are supposed to be present. However, the same statement applies to even a situation where there is only one destination memory. Also, in the embodiment described above, the intermittent information generator 131 is supposed to calculate the intermittent period information and the lowest frequency information and the clock generator 132 is supposed to adjust dynamically the bus operating frequency to be supplied to the communications circuitry 133 by reference to the lowest frequency information. However, the frequency does not always have to be adjusted dynamically.

Optionally, the other components of the circuit may also be designed by implementing the intermittent information generator 131 as a series of processing in a design tool and by using the values of intermittent period information and lowest frequency information that have been determined by the tool as design parameters. In that case, the clock generator 132 does not have to have the ability to change dynamically the frequency of a clock signal such as VCXO but may also be implemented as a clock generator which oscillates at a fixed frequency as defined by the lowest frequency information that has been determined as a design parameter. Alternatively, the clock generator 132 may also be supplied with a clock signal to be driven at a predetermined frequency by an external device. In this case, the "predetermined frequency" is the lowest frequency which has been generated by calculation by a design tool. Also, the intermittent period information and the rate management information may be stored in a storage area such as a register file, a memory or a flip-flop so as to be retrieved by the transmission interval setting circuitry 134 at the start of its operation. By implementing the intermittent information generator 131 as a design tool, the bus band can be designed with a computation program. As a result, there is no need to carry out cut-and-try design and verify processes on the bus band through simulations and emulations, and the development process can be accomplished by performing a reduced numbers of steps, which is beneficial.

Figure 26:
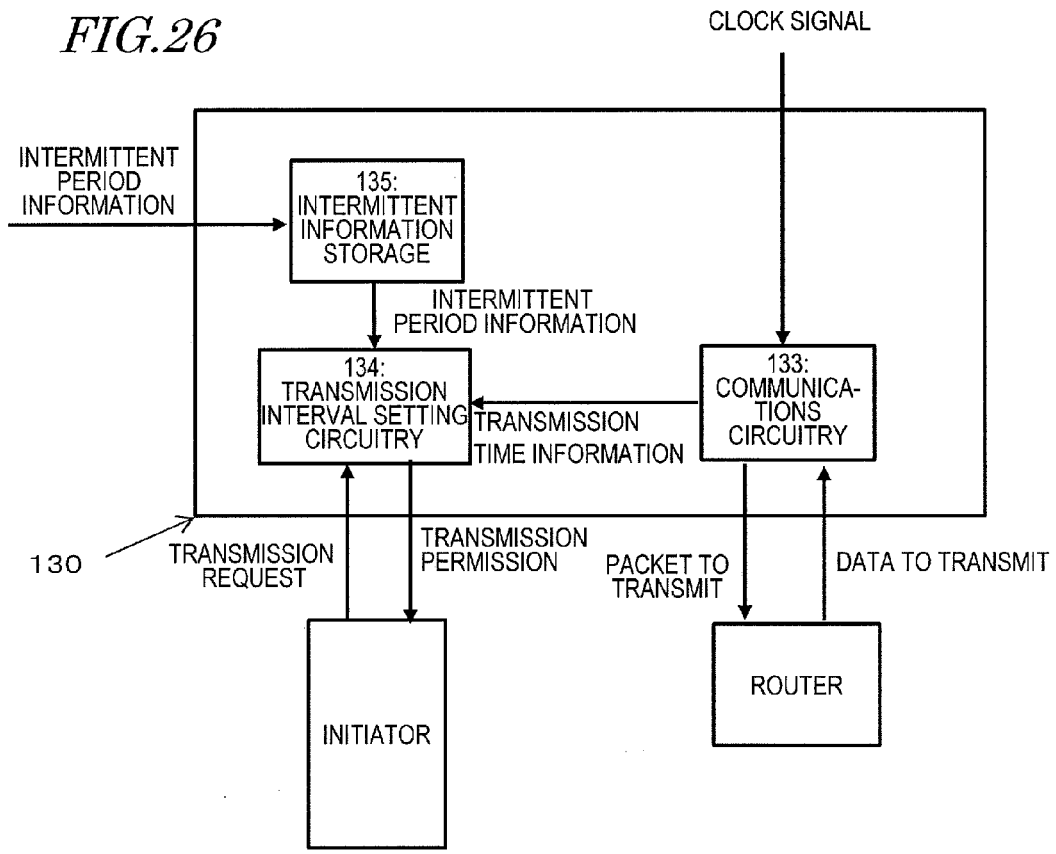
FIG. 26 illustrates a modified example of the first embodiment.

FIG. 26 illustrates a modified configuration for the NIC 130 of the first embodiment.

The NIC 130 shown in FIG. 26 includes an intermittent information storage 135 instead of the intermittent information generator 131 shown in FIG. 15, which is a major difference from the NIC 130 shown in FIG. 15.

The intermittent information storage 135 may be implemented as a register that uses a flip-flop, for example, and stores the intermittent period information that has been calculated using a design tool. A clock signal driven at the lowest frequency information that has been calculated with the design tool is generated by an external device and supplied to the communications circuitry 133. In response to the clock signal, the communications circuitry 133 makes data communications with a router. Except that the intermittent information generator 131 that generates intermittent information is replaced with the intermittent information storage that stores the intermittent information received from an external device, the respective components of the first embodiment described above operate in the same way in the configuration shown in FIG. 26, too.

As the transmission time information, the transmission time of a request packet may be recorded. Or a counter value which is reset every time a request packet is transmitted and which either increments or decrements with time may also be monitored.

Figure 27:
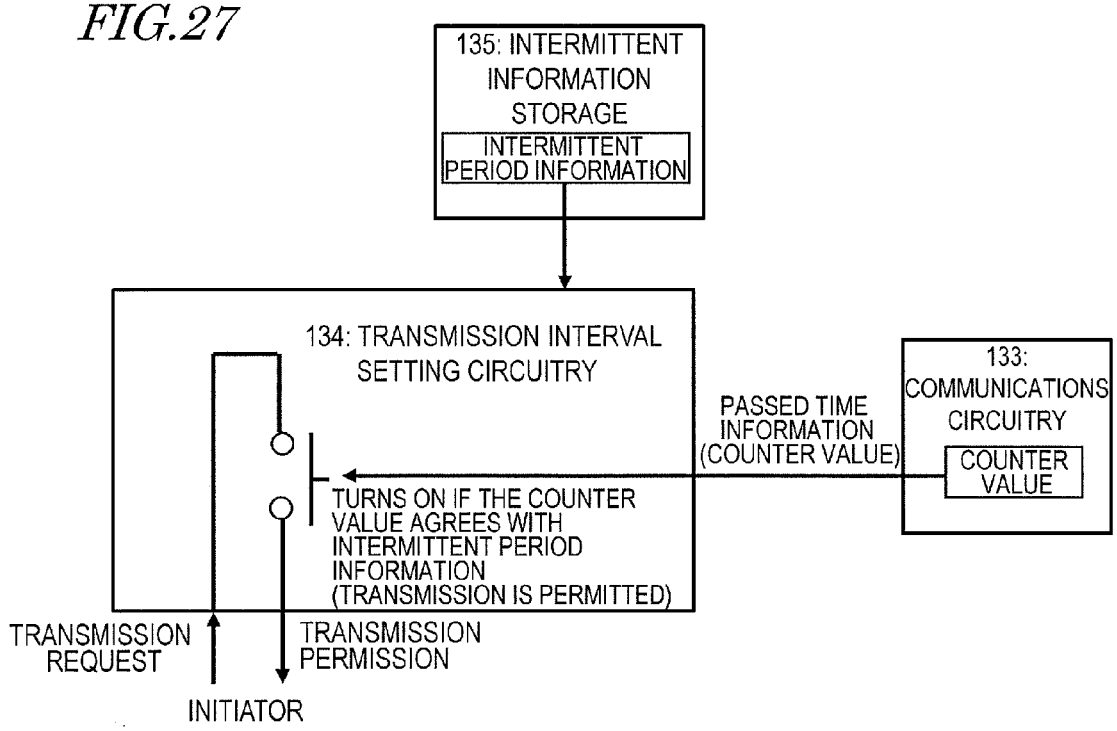
FIG. 27 shows an example in which an incrementing counter is used.

FIG. 27 illustrates an example in which an incrementing counter is used. When the communications circuitry transmits a request packet, the count of the counter is reset into zero. And the counter value indicates the amount of time that has passed since the request packet was transmitted. The transmission interval setting circuitry 134 gets the count of the counter as passed time information. If the count turns out to be equal to or greater than the value of the intermittent period information, the transmission interval setting circuitry 134 sends transmission permission responsive to the transmission request from the initiator. The counter, of which the count needs to be monitored, may also be provided for the transmission interval setting circuitry 134. In that case, the transmission interval setting circuitry 134 may be notified of information indicating the time when a request packet was transmitted by the communications circuitry 133.

Figure 28:
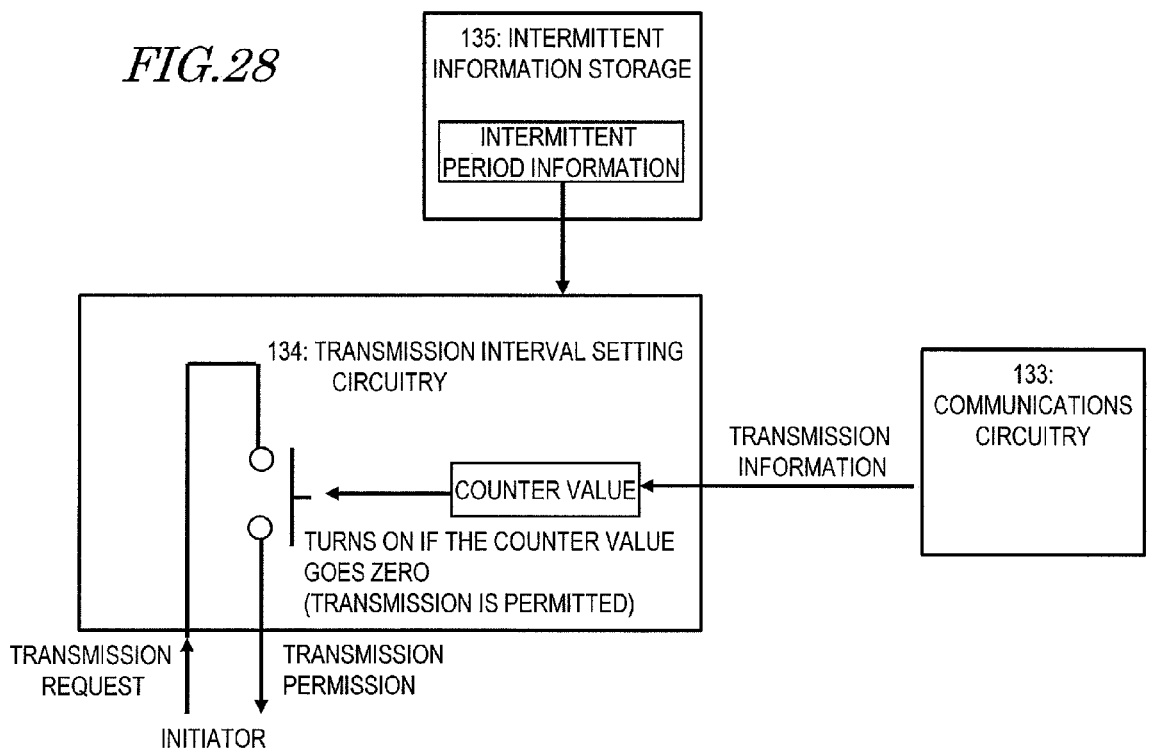
FIG. 28 illustrates an example in which a decrementing counter is used.

FIG. 28 illustrates an example in which a decrementing counter is used. The communications circuitry 133 notifies the transmission interval setting circuitry 134 of the time when a request packet was transmitted. On receiving the notification, the transmission interval setting circuitry 134 resets the counter value into the value of the intermittent period information. If the count turns out to be zero or less, the transmission interval setting circuitry 134 sends transmission permission responsive to the transmission request from the initiator. The counter, of which the count needs to be monitored, may also be provided for the communications circuitry 133. In that case, the communications circuitry 133 may be configured to retrieve the intermittent period information from the intermittent information storage 135.

As a result, the communications circuitry 133 includes a counter that counts the period of a clock signal in the system, resets the counter when the data supplied from the initiator is transmitted, and provides the counter value as passed time information for the transmission interval setting circuitry 134. On finding that the passed time information has reached the intermittent period information or a predetermined count, the transmission interval setting circuitry 134 may send transmission permission responsive to the transmission request from the initiator.

Embodiment 2

Figure 29:
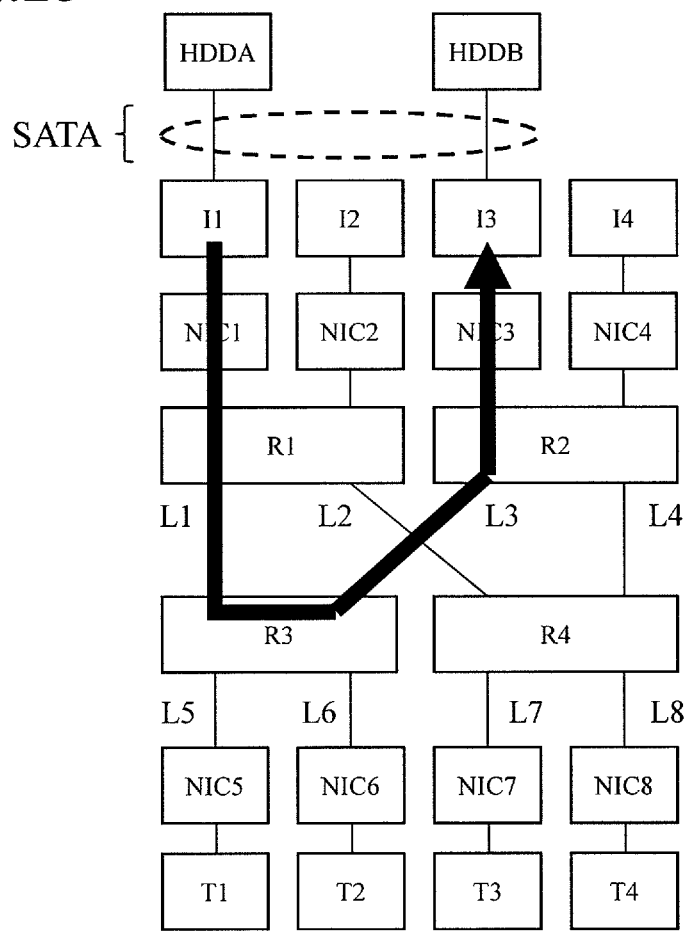
FIG. 29 illustrates a system configuration according to a second exemplary embodiment.

FIG. 29 illustrates a system configuration according to a second embodiment. In FIG. 29, any component also shown in FIG. 1 and having substantially the same function as its counterpart that has already been described is identified by the same reference numeral and its description will be omitted herein to avoid redundancies.

In this embodiment, not only the communications that have already been described for the first embodiment but also a direct communication between the initiators I1 and I3 through no memories are carried out. In the following description, the NIC 130 having the configuration shown in FIG. 15 is supposed to be used again. The NIC 130 shown in FIG. 15 corresponds to the NIC1 shown in FIG. 29, for example. Thus, the NIC 130 will be referred to herein as NIC1 for convenience sake.

The router R3 shown in FIG. 29 has had its routing diagram set so that when receiving a packet that appoints I3 as its destination, the router R3 sends the packet to the router R2 through a link L3. A specific example of such a communication may be a control device for input/output ports at which the initiators I1 and I3 interface with an external hard disk drive.

Hereinafter, it will be described what processing needs to be carried out in order to copy stored data from a hard disk drive connected to Port I1 to another hard disk drive connected to Port I3 at high speeds with no memories interposed.

In FIG. 29, a hard disk drive HDDA from which data is supposed to be transferred is connected to the Port I1, and another hard disk drive HDDB to which the data is supposed to be transferred is connected to the Port I3. A connection interface for these hard disk drives may be serial ATA, for example.

FIG. 30 shows flow configuration information for the Port I1. Information about I4 is not shown because it is quite the same as what is shown in FIG. 17. Meanwhile, FIG. 31 shows only the flows that appoint I3 as their destination as extracted from FIG. 30. Even if such a direct communication needs to be carried out between initiators, good performance can also be guaranteed just by handling the initiator on the receiving end as a single destination.

When the intermittent information generator 131 calculates the intermittent period information, this NIC1 makes calculations with respect to not only the destinations T1 and T2 but also this destination I3 as well. If the intermittent period information about the destination I3 is identified by P5, the intermittent period information can be calculated by the following Equation (20):

$$P_5 = \frac{H + L_{13}}{W} + \frac{H + L_{23}}{W} \text{ (cycle)} \tag{20}$$

In making a direct communication between two initiators (e.g., between I1 and I3), there are three routers R1, R2 and R3 on the communications route. That is to say, the number of stages to pass increases by one compared to a situation where a memory is appointed as a destination. Thus, in such a situation, the fixed latency C5 is calculated by the following Equation (21):

$$C5 = 2 \times (2 \times N + 3 \times R) \text{ (cycle)} \tag{21}$$

In determining whether or not the intended performance can be guaranteed with respect to such a direct communication flow, the following Inequality (22) is used:

$$P_5 \leq \min\left\{F_0 \cdot A_{13} - C_5, \frac{F_0 \cdot S_1 - C_5}{2}\right\} \tag{22}$$

Figures 32, 33:
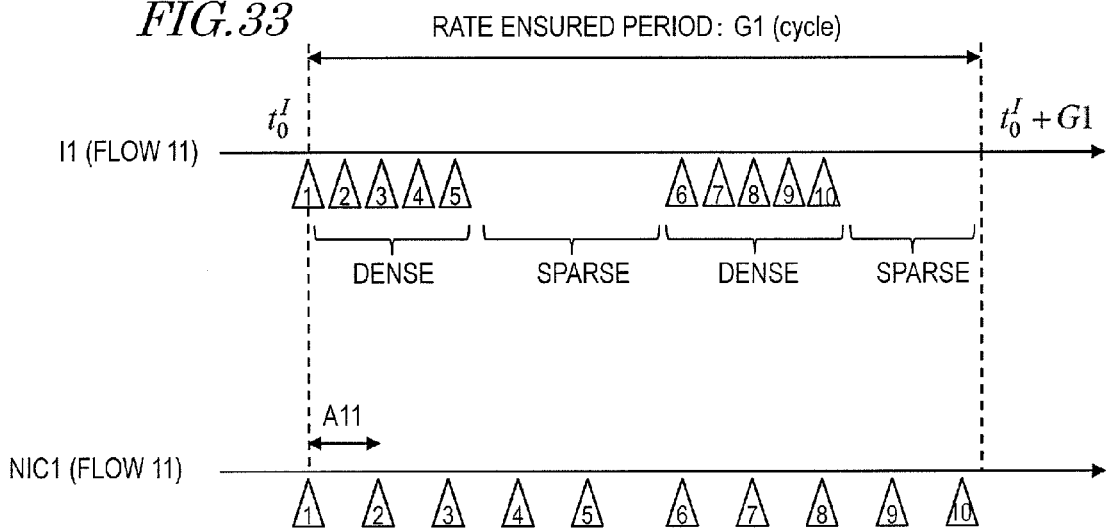
FIG. 32 shows an example of a management table for NIC1 that is connected to the Port I1.
FIG. 33 shows the access timings with respect to the flow 11 that should lead from the processor I1 to the memory T1.

The intermittent information generator 131 determines the lowest frequency information by selecting an operating frequency F at which this Inequality (22) is satisfied with respect to not only every flow headed to a memory but also every direct communications flow. FIG. 32 shows an example of a management table for NIC1 that is connected to the Port I1. The rate ensured period G1, intermittent period information P5, transmission time information J5 and next transmission time D5, which are parameters about the direct communications flow that appoints the Port I3 as its destination, are stored after having been converted to cycles with the lowest frequency information F. By reference to this management table shown in FIG. 32, transmission interval setting circuitry 134 of this NIC1 carries out the same control as what has already been described for the first embodiment on the destination I3, too.

By carrying out such a direct communication between the initiators as described for this embodiment, a communication throughput exceeding the physical bands of the targets T1 through T4 can be obtained, which is very beneficial. Particularly, supposing a situation where every initiator shares the same system memory as their target, if a configuration in which every flow should pass through that system memory is adopted, the memory cannot help having a very broad physical band. On the other hand, since such a direct communications flow between initiators does not pass through any memory, the throughputs of the initiators can be increased independently of the physical band of the memory.

Embodiment 3

In FIG. 1, if there is a fluctuation with a significant width in access timing between the initiators, then a de-jittering buffer of a large size should be provided on the target end in order to iron out such a fluctuation. As a result, an impact on the area could be a problem or a non-guaranteed access flow such as the flow I4 could be difficult to process while a plurality of processors are accessing densely. In that case, by configuring the transmission interval setting circuitry 134 (see FIG. 15) as in this embodiment, these problems can be avoided.

FIG. 33 shows the access timings with respect to the flow I1 that should lead from the processor I1 to the memory T1. In this flow I1, accesses are made ten time (i.e., M1=10) during the rate ensured period of G1 cycles. However, there is a fluctuation in access timing. That is to say, a dense access period bursting with consecutive accesses alternates with a sparse access period in which there are no accesses at all one after another. Such a fluctuation in access density could be caused partly because the internal cache of the initiator sometimes hits but sometimes fails to hit, for example.

FIG. 33 also shows the times when the NIC1 transmits access requests. As can be seen from FIG. 33, the transmission intervals are adjusted so that the interval between the accesses that have been requested consecutively during the dense period converges to the average access interval of the flow I1. Hereinafter, it will be described how the transmission interval setting circuitry 134 needs to operate in order to get such a transmission interval control done.

Except the transmission interval setting circuitry 134, the NIC of this embodiment has the same configuration as the NIC 130 (see FIG. 15) of the first embodiment. As their common components operate just like their counterparts of the NIC 130 of the first embodiment shown in FIG. 15, their description will be omitted herein.

(Transmission Interval Setting Circuitry 134)

Figures 34, 35:
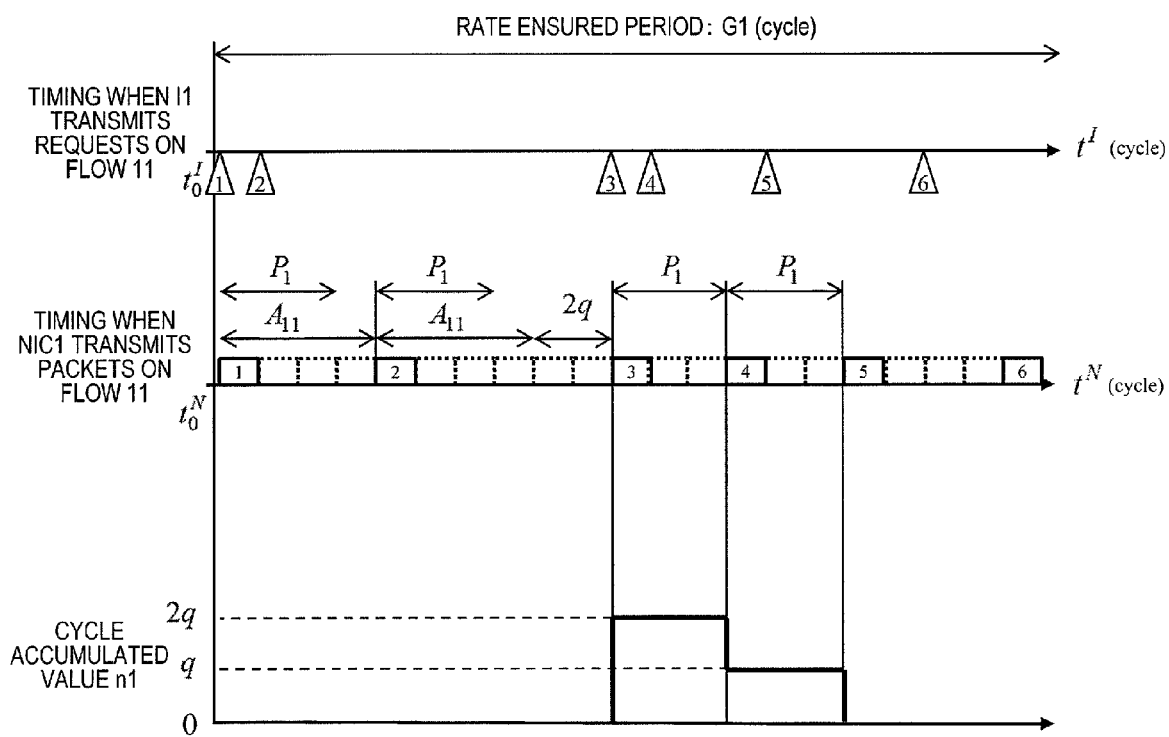
FIG. 34 shows an exemplary management table.
FIG. 35 illustrates how the transmission interval of the flow 11 is controlled.

FIG. 34 shows an exemplary management table to be stored in the transmission interval setting circuitry 134. As can be seen from FIG. 34, this management table includes everything on the management table of the first embodiment (see FIG. 21) but also a destination-by-destination number of accumulated cycles as well. The number of accumulated cycles is reset into zero every time a rate ensured period begins and is used to accumulate time lags (in cycles) between the time of transmission from the NIC and the average access interval during each rate ensured period. FIG. 35 illustrates how the transmission interval of the flow I1 is controlled. For illustrative purposes, the packets of the flow I1 to be transmitted from the processor I1 to the memory T1 are numbered 1 through 6. Supposing each packet has a size of N1 flits, the number q of cycles it takes to transfer a single packet is represented by the following Equation (23):

$$q = \frac{H + N_1}{W} \text{ (cycle)} \tag{23}$$

For the sake of simplicity, the size of every packet transmitted from the processors I1, I2 and I3 to the memory T1 is supposed to be q. In the first cycle t0 of the rate ensured period G1, the cycle accumulated value n1 has been reset into zero. The intermittent period information P1 and the average command interval A11 are supposed to satisfy the following Inequality (24):

$$A_{11} \geq P_1 \tag{24}$$

When the processor I1 issues a transmission request for the first time, the transmission interval setting circuitry 134 transmits Packet #1 to the memory T1 immediately if the amount of time that has passed since the last packet was transmitted in the previous rate ensured period is equal to or greater than P1 cycles specified by the intermittent period information. Subsequently, in response to Transmission Request #2 that has been issued next, Packet #2 is transmitted at an interval of A11, which is the average command interval, after the previous Packet #1 was transmitted. Due to a fluctuation in access timing, there are no access requests in the interval from the time when the processor I1 issued Transmission Request #2 through the time when the processor I1 issues Transmission Request #3. Next, in response to that Transmission Request #3, Packet #3 is transmitted to the memory T1. In this case, the transmission interval setting circuitry 134 records the difference (i.e., time lag) between the amount of time that has passed since Packet #2 was transmitted and the average command interval. In the example illustrated in FIG. 35, the difference (time lag) is 2q cycles. The transmission interval setting circuitry 134 records that value of 2q cycles as a cycle accumulated value n1. Next, when the processor I1 issues Transmission Request #4, the timing to transmit Packet #4 is calculated by the following Equation (25) with the cycle accumulated value n1 representing the time lag from the average command interval taken into account:

$$t_4{}^N = t_3{}^N + \max\{A_{11} - n_1, P_1\} \tag{25}$$

where t3 and t4 indicate the times when Packets #3 and #4 were respectively transmitted.

If t4 is calculated in the example shown in FIG. 35, the following Equation (26) is satisfied:

$$t_4{}^N - t_3{}^N = \max\{4q - 2q, 3q\} = 3q \tag{26}$$

Thus, Packet #4 is transmitted at the interval specified by the intermittent period information P1. In this case, n1 is updated by subtracting the number of cycles consumed from the cycle accumulated value n1 as can be seen from the following Equation (27):

$$n_1 = n_1 - (A_{11} - \max\{A_{11} - n_1, P_1\}) \tag{27}$$

In FIG. 35, the value of n1 is updated from 2q into q. In the same way, in response to the next Transmission Request #5, the timing of transmission is set by shortening the average command interval A11 by q cycles using the accumulated value q as the cycle accumulated value n1. As a result, the cycle accumulated value n1 becomes equal to zero. Consequently, in response to Transmission Request #6 issued by the processor I1, Packet #6 is transmitted to the memory T1 at the average command interval A11.

Figure 36:
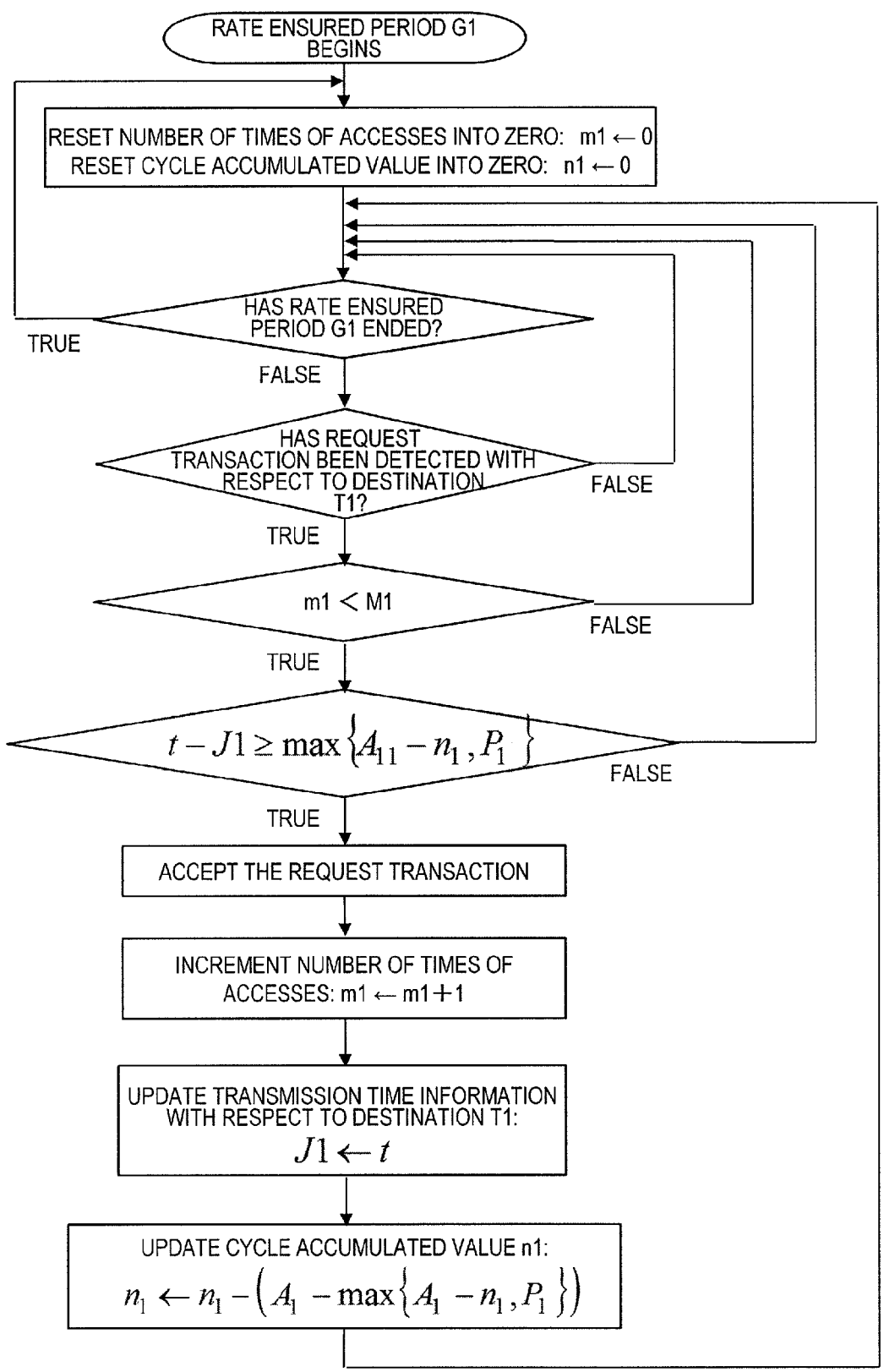
FIG. 36 shows the flow of processing to be performed by transmission interval setting circuitry 134 according to a third exemplary embodiment.

By making such management on the cycle accumulated values, transmission requests issued by the respective processors can be averaged and the fluctuation can be ironed out. FIG. 36 shows the flow of processing to be performed by the transmission interval setting circuitry 134 of this embodiment. As these processing steps shown in FIG. 36 have already been described, they will not be described all over again to avoid redundancies.

According to this embodiment, even if there is a relatively small difference between the intermittent period information P1 and the average access interval (i.e., average command interval A11) of the processor and if there is a fluctuation of the average access interval or more in access timing, the difference (i.e., time lag) between the amount of time that has passed since the latest packet transmission timing and the average command interval is calculated and the next packet transmission timing is accelerated so as to reduce the difference. As a result, the average required band of the processor is not exceeded.

The present disclosure is applicable to a network bus controller, control method and control program which use a data transfer route control technology on an on-chip bus at an SoC for an integral device, a general-purpose processor, or a local bus on a DSP.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A controller for use in a system in which initiators and targets are connected together via distributed buses to control transmission timing of an access request that has been received from any of the initiators through the buses, the controller comprising:
   an intermittent information storage configured to store intermittent period information that has been generated based on system configuration information about the system's configuration and flow configuration information indicating, on a flow basis, a specification required for each said initiator to access one of the targets;
   communications circuitry configured to obtain a clock signal to be driven at a bus operating frequency that guarantees real-time performance for each said initiator and that has been generated based on the system configuration information and the flow configuration information, configured to packetize data supplied from the initiator, configured to send a packet to a router and configured to record a transmission time of an input data in response to the clock signal; and
   transmission interval setting circuitry configured to set a time to send transmission permission responsive to a transmission request based on the intermittent period information, a time when the transmission request from the initiator is detected, and a previous transmission time.

2. The controller of claim 1, wherein the intermittent information storage stores, as the intermittent period, the number of bus cycles that it takes for the targets to finish receiving every data in a situation where every initiator has transmitted data at the same time at the maximum data length at which data is transmissible simultaneously by every initiator.

3. The controller of claim 1, wherein the intermittent information storage stores a maximum latency involved to transmit and receive a packet which has been calculated based on at least the intermittent period, and also stores, as the bus operating frequency, the lowest bus operating frequency to be determined under the condition that the maximum latency does not exceed the shortest permissible latency of any of the initiators.

4. The controller of claim 3, wherein the transmission interval setting circuitry sets the time to send transmission permission responsive to the transmission request so that the intermittent period becomes the shortest interval at which a series of packets are transmitted.

5. The controller of claim 4, wherein the transmission interval setting circuitry limits the number of times of transmission within a preset rate ensured period to a predetermined number of times or less as a specification for the system.

6. The controller of claim 4, wherein the transmission interval setting circuitry sets the interval at which a series of packets are transmitted so that the transmission interval becomes as close to an average access interval, which has been defined in advance as a specification for the system, as possible.

7. The controller of claim 1, wherein the intermittent information storage stores the intermittent period, which has been calculated based on the packet size of each said initiator, with respect to each of the targets and initiators that are destinations.

8. The controller of claim 1, wherein the intermittent information storage stores the intermittent period which has been calculated with respect to each of the targets that are destinations.

9. The controller of claim 1, wherein the communications circuitry uses, as a time to transmit the data supplied from the initiator, the value of a counter which counts the number of periods of a clock signal in the system.

10. The controller of claim 1, wherein the communications circuitry includes a counter which counts the number of periods of a clock signal in the system, resets the counter at a time to transmit the data supplied from the initiator, and provides the count of the counter as passed time information for the transmission interval setting circuitry, and
   wherein the transmission interval setting circuitry sees if the passed time information has reached either the intermittent period information or a predetermined count and sends transmission permission responsive to the transmission request from the initiator.

11. The controller of claim 1, wherein if the initiator is sending a series of access requests continuously to the target,
   the transmission interval setting circuitry transmits the access request to the target at regular intervals in the period specified by the intermittent period information.

12. A controller for use in a system in which initiators and targets are connected together via distributed buses to control transmission timing of an access request that has been received from any of the initiators through the buses, the controller comprising:
   an intermittent information generator configured to generate intermittent information, including information about an intermittent period in which interference between packets is able to be restricted and bus operating frequency information indicating the lowest bus operating frequency at which real-time performance is guaranteed for each said initiator, based on system configuration information about the system's configuration and flow configuration information indicating, on a flow basis, a specification required for each said initiator to access one of the targets;

a clock generator configured to generate a clock signal by reference to the bus operating frequency information;

communications circuitry configured to operate in response to the clock signal, configured to packetize and transmit input data, and configured to record the transmission time of the input data; and transmission interval setting circuitry configured to set a time to send transmission permission responsive to a transmission request based on the intermittent period, the time when the transmission request from the initiator is detected, and the previous transmission time.

13. The controller of claim 12, wherein the intermittent information generator calculates, as the intermittent period, the number of bus cycles that it takes for the targets to finish receiving every data in a situation where every initiator has transmitted data at the same time at the maximum data length at which data is transmissible simultaneously by every initiator.

14. The controller of claim 12, wherein the intermittent information generator calculates a maximum latency involved to transmit or receive a packet based on at least the intermittent period, and also determines, as the bus operating frequency, the lowest bus operating frequency to be determined under the condition that the maximum latency does not exceed the shortest permissible latency of any of the initiators.

15. The controller of claim 14, wherein the transmission interval setting circuitry sets the time to send transmission permission responsive to the transmission request so that the intermittent period becomes the shortest interval at which a series of packets are transmitted.

16. The controller of claim 15, wherein the transmission interval setting circuitry limits the number of times of transmission within a preset rate ensured period to a predetermined number of times or less as a specification for the system.

17. The controller of claim 15, wherein the transmission interval setting circuitry sets the interval at which a series of packets are transmitted so that the transmission interval becomes as close to an average access interval, which has been defined in advance as a specification for the system, as possible.

18. The controller of claim 12, wherein the intermittent information generator calculates the intermittent period based on the packet size of each said initiator with respect to each of the targets and initiators that are destinations.

19. The controller of claim 12, wherein the intermittent information generator calculates the intermittent period with respect to each of the targets that are destinations.

20. A system design method for determining the bus frequency of a system in which initiators and targets are connected together via distributed buses, the method comprising:

generating an intermittent period in which interference between packets is able to be restricted based on system configuration information about the system's configuration and flow configuration information indicating, on a flow basis, a specification required for each said initiator to access one of the targets, the system configuration information and the flow configuration information having been collected in advance;

calculating a maximum latency involved to transmit or receive a packet based on at least the intermittent period; and determining the lowest bus operating frequency under the condition that the maximum latency does not exceed the shortest permissible latency of any of the initiators.

* * * * *